(12) United States Patent
Beck et al.

(10) Patent No.: US 11,571,961 B2
(45) Date of Patent: Feb. 7, 2023

(54) TRANSMISSION FOR A MOTOR VEHICLE, MOTOR VEHICLE POWERTRAIN, AND METHOD FOR OPERATING A TRANSMISSION

(71) Applicant: ZF Friedrichshafen AG, Friedrichshafen (DE)

(72) Inventors: Stefan Beck, Eriskirch (DE); Johannes Kaltenbach, Friedrichshafen (DE); Matthias Horn, Tettnang (DE); Uwe Griesmeier, Markdorf (DE); Thomas Martin, Weissensberg (DE); Fabian Kutter, Kressbronn (DE); Michael Wechs, Weißensberg (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/274,067

(22) PCT Filed: Aug. 5, 2019

(86) PCT No.: PCT/EP2019/071000
§ 371 (c)(1),
(2) Date: Mar. 5, 2021

(87) PCT Pub. No.: WO2020/048708
PCT Pub. Date: Mar. 12, 2020

(65) Prior Publication Data
US 2022/0111718 A1  Apr. 14, 2022

(30) Foreign Application Priority Data
Sep. 7, 2018  (DE) ..................... 10 2018 215 237.3

(51) Int. Cl.
*B60K 6/48* (2007.10)
*B60K 6/365* (2007.10)
(Continued)

(52) U.S. Cl.
CPC ............... *B60K 6/365* (2013.01); *B60K 6/48* (2013.01); *B60K 6/547* (2013.01); *F16H 3/663* (2013.01);
(Continued)

(58) Field of Classification Search
CPC .......... B60K 6/48; B60K 6/547; F16H 3/724; F16H 2200/2007; F16H 2200/2043;
(Continued)

(56) References Cited

U.S. PATENT DOCUMENTS 10,570,995 B2 * 2/2020 Beck ..................... B60K 6/365
2006/0234821 A1 * 10/2006 Bucknor ................ F16H 3/728
475/5

(Continued)

FOREIGN PATENT DOCUMENTS

DE  102013013947 A1  2/2015
DE  102014218610 A1  3/2016

OTHER PUBLICATIONS

International Search Report (English Translation) PCT/EP2019/071000, dated Oct. 14, 2019, (2 pages).

*Primary Examiner* — Huan Le
(74) *Attorney, Agent, or Firm* — Dority & Manning, P.A.

(57) ABSTRACT

A transmission (G) for a motor vehicle includes an electric machine (EM1), a first input shaft (GW1), a second input shaft (GW2), an output shaft (GWA), two planetary gear sets (P1, P2, P3), and at least five shift elements (A, B, C, D, E). Different gears are implementable by selectively actuating the at least five shift elements (A, B, C, D, E) and, in addition, in interaction with the electric machine (EM1), (Continued)

different operating modes are implementable. A drive train for a motor vehicle with the transmission (G), and to a method for operating the transmission (G) are also provided.

17 Claims, 22 Drawing Sheets

(51) Int. Cl.
  *B60K 6/547* (2007.10)
  *F16H 3/66* (2006.01)
(52) U.S. Cl.
  CPC ............... *B60K 2006/4825* (2013.01); *F16H 2200/2028* (2013.01)
(58) Field of Classification Search
  CPC ..... F16H 2200/2046; F16H 2200/2064; F16H 2200/0043
  See application file for complete search history.

(56) References Cited

U.S. PATENT DOCUMENTS

| | | | |
|---|---|---|---|
| 2009/0186735 A1* | 7/2009 | Iwanaka | B60K 6/365 475/5 |
| 2016/0201769 A1 | 7/2016 | Scholle et al. | |

* cited by examiner

| gear | engaged shifting elements | | | | |
|---|---|---|---|---|---|
| | A | B | C | D | E |
| 1 | X | | | X | |
| 2 | X | | X | | |
| 3.1 | X | X | | | |
| 3.2 | | X | | | X |
| 3.3 | | | | X | X |
| 3.4 | | X | X | | |
| 3.5 | | X | | X | |
| 4 | | | X | | X |

| gear | engaged shifting elements | | | | |
|---|---|---|---|---|---|
| | A | B | C | D | E |
| E2 | X | | | | |
| E4 | | | | | X |

| gear | engaged shifting elements | | | | |
|---|---|---|---|---|---|
| | A | B | C | D | E |
| V3 | | X | | | |

Fig. 6

| gear | engaged shifting elements | | | | | |
|---|---|---|---|---|---|---|
| | A | B | C | D | E | F |
| 1 | X | | | X | | |
| 2 | X | | X | | | |
| 3.1 | X | X | | | | |
| 3.2 | | X | | | X | |
| 3.3 | | | | X | X | |
| 3.4 | | X | X | | | |
| 3.5 | | X | | X | | |
| 3.6 | | X | | | | X |
| 3.7 | | | X | | | X |
| 4 | | | X | | X | |
| Z1 | | | | X | | X |
| Z2 | | | | | X | X |

Fig. 7

| gear | engaged shifting elements | | | | | |
|---|---|---|---|---|---|---|
| | A | B | C | D | E | F |
| E2 (EM1) | X | | | | | |
| E3 (EM2) | | X | | | | |
| E4 (EM1) | | | | | X | |

| gear | engaged shifting elements | | | | | |
|---|---|---|---|---|---|---|
| | A | B | C | D | E | F |
| E1 | X | | | X | | |
| E2 | X | | X | | | |
| E3.1 | X | X | | | | |
| E3.2 | | X | | | X | |
| E3.3 | | | | X | X | |
| E3.4 | | X | X | | | |
| E3.5 | | X | | X | | |
| E3.6 | | X | | | | X |
| E3.7 | | | X | | | X |
| E4 | | | X | | X | |
| EZ1 | | | | X | | X |
| EZ2 | | | | | X | X |

Fig. 10

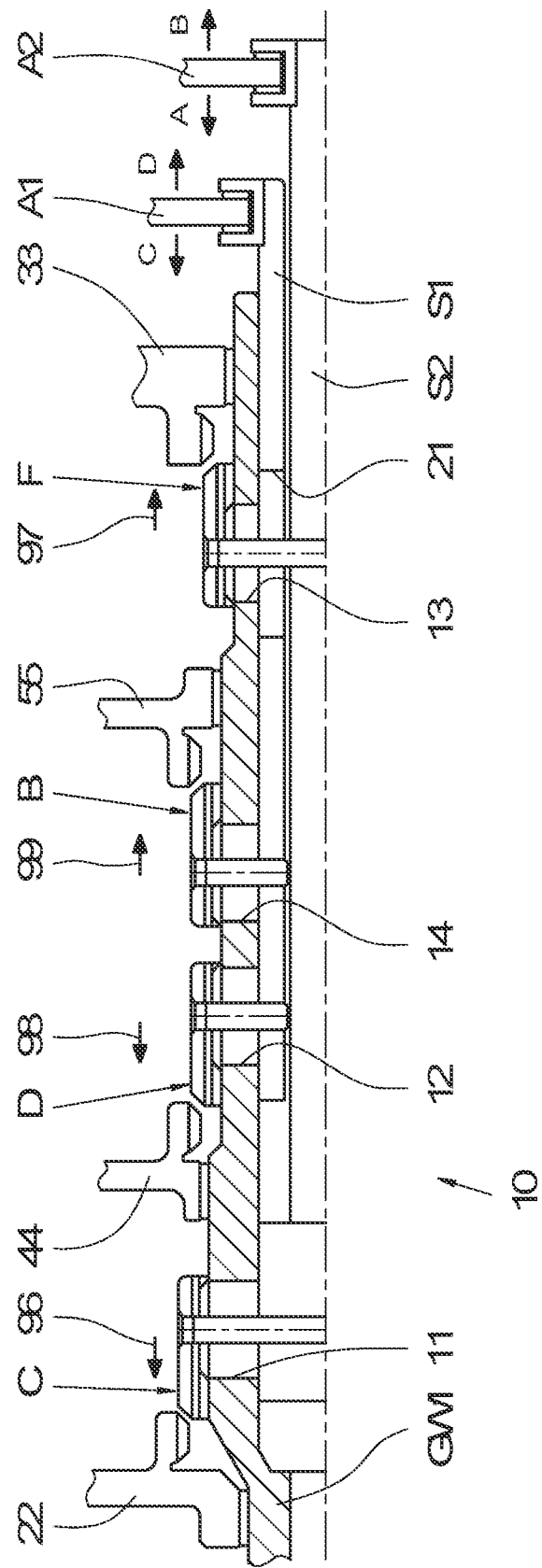

TRANSMISSION FOR A MOTOR VEHICLE, MOTOR VEHICLE POWERTRAIN, AND METHOD FOR OPERATING A TRANSMISSION

CROSS-REFERENCE TO RELATED APPLICATION

The present application is related and has right of priority to German Patent Application No. 102018215237.3 filed in the German Patent Office on Sep. 7, 2018 and is a nationalization of PCT/EP2019/071000 filed in the European Patent Office on Aug. 5, 2019, both of which are incorporated by reference in their entirety for all purposes.

FIELD OF THE INVENTION

The invention relates generally to a transmission for a motor vehicle, including an electric machine, a first input shaft, a second input shaft, an output shaft, and a first planetary gear set, a second planetary gear set, and a third planetary gear set. The planetary gear sets each include multiple elements, wherein a first, a second, a third, a fourth, and a fifth shift element are provided. A rotor of the electric machine is connected to the second input shaft. Moreover, the invention relates generally to a motor vehicle drive train, in which the transmission is utilized, and to a method for operating the transmission.

BACKGROUND

In hybrid vehicles, transmissions are known which also include, in addition to a gear set, one or multiple electric machine(s). In this case, the transmission is usually configured to be multi-stage, i.e., multiple different ratios are selectable, as gears, between an input shaft and an output shaft by actuating appropriate shift elements, wherein this is preferably automatically carried out. Depending on the arrangement of the shift elements, the shift elements are clutches or brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be integrated in the transmission in order to implement various operating modes in different ways.

DE 10 2014 218 610 A1 describes a transmission for a hybrid vehicle, which includes, in addition to a first input shaft and an output shaft, three planetary gear sets and an electric machine. Moreover, in one variant, six shift elements are provided, via which different power paths are achieved from the first input shaft to the output shaft while implementing different gears and, in addition, different integrations of the electric machine can be configured. Here, purely electric driving can also be implemented simply by transmitting power via the electric machine.

SUMMARY OF THE INVENTION

Example aspects of the present invention provide a transmission for a motor vehicle, with which, with a compact design, different operating modes can be implemented in a suitable way.

According to example aspects of the invention, a transmission includes an electric machine, a first input shaft, a second input shaft, an output shaft, as well as a first planetary gear set and a second planetary gear set. The planetary gear sets include multiple elements, wherein, preferably, a first element, a second element, and a third element are associated with each of the planetary gear sets. In addition, a first shift element, a second shift element, a third shift element, a fourth shift element, and a fifth shift element are provided, via the selective actuation of which different power paths can be implemented while shifting different gears. It is particularly preferred when at least four different gears can be formed between the first input shaft and the output shaft that differ in terms of ratio. Moreover, a rotor of the electric machine is connected to the second input shaft.

Within the meaning of the invention, a "shaft" is understood to be a rotatable component of the transmission, via which associated components of the transmission are rotationally fixed to each other or via which a connection of this type is established upon actuation of an appropriate shift element. The particular shaft can connect the components to each other axially or radially or also both axially and radially. The particular shaft can also be present as an intermediate piece, via which a particular component is connected, for example, radially.

Within the meaning of the invention, "axially" means an orientation in the direction of a longitudinal central axis, along which the planetary gear sets are arranged coaxially to one another. "Radially" is then understood to mean an orientation in the direction of the diameter of a shaft that lies on this longitudinal central axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft is preferably situated axially in the area of an end of the transmission, at which a mounting interface of the first input shaft is also provided, the mounting interface establishing the connection to the upstream prime mover. This type of arrangement is particularly suitable for the application in a motor vehicle with a drive train aligned transversely to the direction of travel of the motor vehicle.

Alternatively, an output of the transmission can also be provided, in principle, at an axial end of the transmission situated opposite to a mounting interface of the first input shaft. In this case, a mounting interface of the output shaft is then designed at an axial end of the output shaft coaxially to a mounting interface of the first input shaft, so that the input and the output of the transmission are located at opposite axial ends of the transmission. A transmission configured in this way is suitable for the application in a motor vehicle with a drive train aligned in the direction of travel of the motor vehicle.

The planetary gear sets are preferably arranged in the sequence first planetary gear set, second planetary gear set, and, finally, third planetary gear set axially following the mounting interface of the first input shaft. In example aspects, an alternative arrangement of the planetary gear sets can also be implemented in the axial direction, provided the connection of the elements of the planetary gear sets allows this.

Advantageously, the output shaft is rotationally fixed to the second element of the second planetary gear set and rotationally fixable to the first input shaft by the second shift element and connectable to the third element of the first planetary gear set by the fifth shift element.

In addition, the first element of the first planetary gear set is fixed at a rotationally fixed component. In addition, the first element of the second planetary gear set is fixable at the rotationally fixed component by the first shift element. In addition, the second input shaft is rotationally fixed to a second element of the first planetary gear set as well as to a third element of the second planetary gear set.

In addition, the first input shaft is rotationally fixable to the second element of the first planetary gear set by the third shift element and connectable in a rotationally fixed manner to the third element of the first planetary gear set via the fourth shift element.

By engaging the first shift element, therefore, the first element of the second planetary gear set is fixed at a rotationally fixed component. By engaging the second shift element, the first input shaft is rotationally fixed to the second element of the second planetary gear set and, thereby, to the output shaft, while an actuation of the third shift element results in a rotationally fixed connection between the second element of the first planetary gear set and the first input shaft. The fourth shift element, in the actuated condition, connects the third element of the first planetary gear set and the first input shaft to each other in a rotationally fixed manner, whereas an engagement of the fifth shift element results in a rotationally fixed connection of the second element of the second planetary gear set and the third element of the first planetary gear set.

The second shift element, the third shift element, the fourth shift element, and the fifth shift element can be clutches, which, upon actuation, each synchronize, if necessary, the particular components of the transmission joined directly to the clutches, with respect to turning motions of the particular components and, thereafter, connect the components to each other in a rotationally fixed manner.

The first shift element can be, in particular, a brake, which, upon actuation, fixes the first element of the second planetary gear set and, consequently, prevents a turning motion thereof.

A particular rotationally fixed connection of the rotatable components of the transmission is preferably implemented, according to example aspects of the invention, via one or also multiple intermediate shaft(s), which can also be present, in this case, as short intermediate pieces when the components are positioned in a spatially dense manner. Specifically, the components that are permanently rotationally fixed to each other can each be present either as individual components that are rotationally fixed to each other, or also as single pieces. In the second case mentioned above, the particular components and the optionally present shaft are then formed by one common component, wherein this is implemented, in particular, for the case in which the particular components are situated spatially close to one another in the transmission.

In the case of components of the transmission that are rotationally fixed to each other only upon actuation of a particular shift element, a connection is also preferably implemented via one or also multiple intermediate shaft(s).

A fixation takes place, in particular, by way of a rotationally fixed connection to a rotationally fixed component of the transmission, which is preferably a permanently non-rotating component, preferably a housing of the transmission, a part of such a housing, or a component rotationally fixed thereto.

Within the meaning of the invention, the "connection" of the rotor of the electric machine to the second input shaft of the transmission is to be understood as a connection of such a type that a constant rotational-speed dependence prevails between the rotor of the electric machine and the second input shaft.

Overall, a transmission according to example aspects of the invention is distinguished by a compact design, low component loads, good gearing efficiency, and low losses.

According to one example embodiment of the invention, selective engagement of the five shift elements results in four gears between the first input shaft and the output shaft that differ in terms of ratio. A first gear can be implemented between the first input shaft and the output shaft by actuating the first shift element and the fourth shift element, in which travel takes place with the simultaneous integration of a prime mover joined at the first input shaft, and the electric machine. Moreover, a second gear results between the first input shaft and the output shaft by engaging the first shift element and the third shift element. In the process, travel is also implemented in each case with the simultaneous integration of the upstream prime mover and the electric machine.

In addition, a third gear can be implemented between the first input shaft and the output shaft by engaging the first shift element and the second shift element. In addition, the third gear can also be selected, in a second variant, by actuating the second and the fifth shift elements, in a third variant by engaging the fourth and the fifth shift elements, in a fourth variant by engaging the second and the third shift elements, and in a fifth variant by engaging the second and the fourth shift elements.

A third gear also results in one further example variant by engaging the second shift element. This is the case because the third gear results already by engaging the second shift element, since the first input shaft and the output shaft are then coupled to one another via the first planetary gear set in combination with a rotationally fixed connection of the output shaft with the second element of the first planetary gear set, so that travel can take place via the upstream prime mover. The electric machine can also be decoupled, since, in this case, only the second shift element is loaded with torque and, in addition, the second input shaft can remain idle. As a result, zero-load losses of the electric machine can be avoided. However, a shift into the first five variants of the third gear has the advantage that the electric machine is also integrated and, as a result, hybrid driving can take place.

A fourth gear can also result between the first input shaft and the output shaft by actuating the third shift element and the fifth shift element.

Given a suitable selection of stationary transmission ratios of the planetary gear sets, a transmission ratio range which is suitable for the application in a motor vehicle is implemented as a result. In this case, gear shifts between the gears are implementable, in which only the condition of two shift elements, in each case, is always to be varied, in that one of the shift elements contributing to the preceding gear is to be disengaged and another shift element is to be engaged in order to implement the subsequent gear. As a further consequence thereof, a shift between the gears can take place very rapidly.

Due to the connection of the electric machine to the second input shaft of the transmission, different operating modes can also be achieved in a simple way.

A first gear between the second input shaft and the output shaft can be utilized for purely electric driving, wherein this first gear results by engaging the first shift element. As a result, given a rotationally fixed connection of the output shaft with the second element of the second planetary gear set, the rotor of the electric machine is coupled, via the first planetary gear set, with the second planetary gear set and, thereby, with the output shaft. A ratio of this first gear corresponds to a ratio of the second gear that is effective between the first input shaft and the output shaft.

In addition, a second gear can also be implemented between the second input shaft and the output shaft for purely electric driving. The fifth shift element is to be actuated in order to engage this second gear. As a result, given a rotationally fixed connection of the output shaft also with the second element of the second planetary gear set, the rotor of the electric machine is coupled, via the first planetary gear set, with the second planetary gear set and, thereby, with the output shaft. A ratio of this second gear, which is effective between the second input shaft and the output shaft, corresponds to a ratio of the fourth gear between the first input shaft and the output shaft.

Starting from purely electric driving in the first gear, which is effective between the second input shaft and the output shaft, the upstream prime mover can then be started in the first gear, which is effective between the first input shaft and the output shaft, in the second gear, which is effective between the first input shaft and the output shaft, and into the first variant of the third gear, which is effective between the first input shaft and the output shaft, since the first shift element contributes to each of these.

A start of the upstream prime mover into the second variant or into the third variant of the third gear, which is effective between the first input shaft and the output shaft, and into the fourth gear, which is effective between the first input shaft and the output shaft, can also take place from the second gear, which is effective between the second input shaft and the output shaft.

As a further operating mode, a charging operation of an electric accumulator can also be implemented, in that only the third shift element is engaged and, thereby, a rotationally fixed connection between the first input shaft and the second input shaft and, thereby, also a coupling with the electric machine are established. At the same time, a force-fit connection to the output shaft is not established, and therefore the transmission is in a neutral position. Apart from a charging operation, a start of the upstream prime mover via the electric machine can also be implemented as a result.

Moreover, powershifts with tractive force support can be implemented. During the gearchange between the first gear, which is effective between the first input shaft and the output shaft, and the second gear, which is effective between the first input shaft and the output shaft, the tractive force with the first shift element engaged can be supported via the electric machine, wherein the synchronization of the shift element to be engaged takes place via a closed-loop control of the rotational speed of the upstream prime mover. Alternatively, however, this can also take place by using synchronized shift elements or also by using another, separate synchronizing mechanism, such as a transmission brake or also one further electric machine, which can be operatively connected directly or indirectly to the first input shaft. If one further shift element, as a separating clutch, is also provided on the input side of the input shaft, the inertial mass of the upstream drive machine can be decoupled during the synchronization.

A gearchange under load can also take place between the second gear, which is effective between the first input shaft and the output shaft, and the first variant of the third gear, which is effective between the first input shaft and the output shaft, with the first shift element engaged.

In addition, a gearchange under load can take place between the second variant of the third gear, which is effective between the first input shaft and the output shaft, and the fourth gear, which is effective between the first input shaft and the output shaft, with the fifth shift element engaged.

The transmission according to example aspects of the invention can also be operated in such a way that a rotational-speed reduction of the electric machine is achieved during driving. It is therefore possible to initially drive in a hybrid manner in the first variant of the third gear, in that the first shift element initially remains engaged either after a gear shift from the second gear into the third gear with torque assistance from the electric machine or after a start of the prime mover into the third gear. In order to now reduce a rotational speed of the electric machine in the first variant of the third gear at higher ground speeds, however, a changeover can be implemented from the first variant of the third gear into the second variant of the third gear, since the rotor of the electric machine has a lower rotational speed here than in the first variant of the second gear. This changeover takes place while obtaining the tractive force via the upstream prime mover, with the second shift element engaged. Initially, the load-free, first shift element is disengaged and, subsequent thereto, the load-free, fifth shift element is engaged, wherein the rotational-speed adaptation takes place via closed-loop control of the rotational speed of the electric machine.

A separate shift element is not necessary for decoupling the upstream prime mover, since, in the second variant of the third gear, which is effective between the first input shaft and the output shaft, the upstream prime mover can be decoupled by disengaging the second shift element.

As a result, the second gear is then implemented, which is effective between the second input shaft and the output shaft.

In addition, in the case of a vehicle that is slowing down, a downshift from the third gear, which is effective between the first input shaft and the output shaft, into the second gear, which is effective between the first input shaft and the output shaft, can be prepared, in that, initially, a changeover takes place from the second variant into the first variant of the third gear and, in the process, the tractive force is obtained via the upstream prime mover, with the second shift element engaged. In the first variant of the third gear, the first shift element is engaged, which becomes necessary in order to support the tractive force via the electric machine as part of the downshift from the third gear into the second gear.

In one further example design option of the invention, a sixth shift element is provided, which is arranged and designed for connecting the first element of the second planetary gear set to the first input shaft in a rotationally fixed manner. As a result, a forward electrodynamic starting operation (EDA mode) can be implemented. EDA means that a speed superimposition of the rotational speed of the internal combustion engine, the rotational speed of the electric machine, and the rotational speed of the transmission output shaft takes place via one or multiple planetary gear set(s), and so it is possible to pull away from rest while the internal combustion engine is running. The electric machine supports a torque in this case. In order to implement the EDA mode, only the sixth shift element is engaged, whereby the first element of the second planetary gear set is rotationally fixed to the input shaft. In this mode, a ratio of the torque of the internal combustion engine results that is higher than that of the first gear. This means, this mode expands the overall gear ratio of the transmission.

By providing the sixth shift element, two further variants of the third gear, which is effective between the first input shaft and the output shaft, also result. In this way, a sixth variant results by engaging the second shift element and the sixth shift element. A seventh variant results by engaging the third shift element and the sixth shift element.

According to one further example design option of the invention, a seventh shift element is provided, which is arranged and designed for interlocking the second planetary gear set. If one planetary gear set is interlocked, the ratio is always one regardless of the number of teeth. In other words, the planetary gear set revolves as a block.

The interlock can take place in that the seventh shift element connects:
- the first element with the second element of the second planetary gear set;
- the first element with the third element of the second planetary gear set; or
- the second element with the third element of the second planetary gear set.

If the seventh shift element is actuated, a third gear results between the second input shaft and the output shaft. A ratio of the third electric gear is between the first electric gear and the second electric gear.

It is pointed out here that the seventh shift element has no functional relationship at all with the sixth shift element, and so the seventh shift element can be utilized in an above-described transmission with or without a sixth shift element.

As one further example design option of the invention, a further electric machine is provided, the rotor of which is connected at the first input shaft. Such an example embodiment has the advantage that further driving modes can be achieved as a result. In addition, as a result, a start of the upstream prime mover can be implemented immediately, if necessary, if the prime mover is designed as an internal combustion engine. In addition, the additional electric machine can support the upstream prime mover in the synchronization of shift elements.

According to one further example embodiment of the invention, the first input shaft is connectable in a rotationally fixed manner, via an eighth shift element, to a connection shaft, which, in turn, is then preferably coupled within a motor vehicle drive train to the prime mover connected upstream from the transmission. The eighth shift element can be, in principle, a force-locking or also as a form-locking shift element in this case, although it is particularly preferred when the eighth shift element is a dog clutch. Via the eighth shift element, the upstream prime mover can therefore also be completely decoupled from the transmission, so that a purely electric operation is implementable in a problem-free manner.

By providing the eighth shift element, the third electric gear can also be implemented, alternatively, by engaging the second shift element and the sixth shift element when the eighth shift element simultaneously decouples the internal combustion engine from the input shaft. In this case, an above-described seventh shift element is not necessary for implementing the third electric gear.

In one example refinement of the invention, one or multiple shift element(s) is/are each implemented as a form-locking shift element. In this case, the particular shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved. It is preferred when the seventh shift element, which is provided if necessary, is also a force-locking shift element. In principle, however, one shift element or multiple shift elements could also be configured as force-locking shift elements, for example, as lamellar shift elements.

Within the scope of example aspects of the invention, the planetary gear sets can each be a minus planetary gear set, provided it allows for a connection of the elements, wherein the first element of the particular planetary gear set is a sun gear, the second element of the particular planetary gear set is a planet carrier, and the third element of the particular planetary gear set is a ring gear. A minus planetary gear set is composed, in a way known, in principle, to a person skilled in the art, of the elements sun gear, planet carrier, and ring gear, wherein the planet carrier, rotatably mounted, guides at least one planet gear, although preferably multiple planet gears, which each individually intermesh with the sun gear and with the surrounding ring gear.

Alternatively thereto, one planetary gear set or also multiple planetary gear sets could also be a plus planetary gear set, however, provided it allows for the connection of the particular elements, wherein the first element of the particular planetary gear set is then a sun gear, the second element of the particular planetary gear set is a ring gear, and the third element of the particular planetary gear set is a planet carrier. In a plus planetary gear set as well, the elements sun gear, ring gear, and planet carrier are present, wherein the planet carrier guides at least one planet gear pair, in which one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. Within the scope of example aspects of the invention, the three planetary gear sets are each preferably designed as a minus planetary gear set, however.

According to one further example embodiment of the invention, the first shift element and the fifth shift element are combined to form a shift element pair, with which one actuating element is associated. The first shift element, on the one hand, and the fifth shift element, on the other hand, can be actuated from a neutral position via the actuating element. This has the advantage that, due to this combination, the number of actuating elements can be reduced and, thereby, the manufacturing complexity can also be reduced.

Alternatively or also in addition to the aforementioned example variants, the second shift element and the third shift element are combined to form a shift element pair, with which one actuating element is associated. The second shift element, on the one hand, and the third shift element, on the other hand, can be actuated from a neutral position via this actuating element. As a result, the manufacturing complexity can be reduced, in that, due to the combination of the two shift elements to form a shift element pair, one actuating unit can be utilized for both shift elements.

Alternatively to the aforementioned example variant, the second shift element and the fourth shift element are combined to form a shift element pair, with which one actuating element is associated. The second shift element, on the one hand, and the fourth shift element, on the other hand, can be actuated from a neutral position via this actuating element. As a result, the manufacturing complexity can be reduced, in that, due to the combination of the two shift elements to form a shift element pair, one actuating unit can be utilized for both shift elements.

In addition, alternatively or also in addition to the two aforementioned example variants, the fourth shift element and the sixth shift element are combined to form a shift element pair, with which one actuating element is associated. The fourth shift element, on the one hand, and the sixth shift element, on the other hand, can be actuated from a neutral position via this actuating element. As a result of this as well, the manufacturing complexity can be reduced, since an actuation of the two shift elements can therefore take place via one common actuating unit.

In addition, alternatively or also in addition to the two aforementioned example variants, the third shift element and the sixth shift element are combined to form a shift element pair, with which one actuating element is associated. The third shift element, on the one hand, and the sixth shift element, on the other hand, can be actuated from a neutral position via this actuating element. As a result of this as well, the manufacturing complexity can be reduced, since an actuation of the two shift elements can therefore take place via one common actuating unit.

It is particularly preferred, in the case that six shift elements are provided, when all three aforementioned shift elements are implemented, and so the six shift elements of the transmission can be actuated via only three actuating elements. As a result, a particularly low manufacturing complexity can be achieved.

According to one example embodiment of the invention, the rotor of the electric machine is rotationally fixed to the second input shaft. Alternatively, according to one example design option of the invention, the rotor is connected to the second input shaft via at least one gear stage. The electric machine can be arranged either coaxially to the planetary gear sets or so as to lie axially offset with respect thereto. In the former case, the rotor of the electric machine can either be rotationally fixed directly to the second input shaft or can be coupled thereto via one or also multiple intermediate gear stage(s), wherein the latter allows for a more favorable configuration of the electric machine with higher rotational speeds and lower torques. The at least one gear stage can be designed as a spur gear stage and/or as a planetary gear stage in this case. In the case of a coaxial arrangement of the electric machine, the two planetary gear sets can then also, more preferably, be arranged axially in the area of the electric machine as well as radially internally with respect thereto, so that the axial installation length of the transmission can be shortened.

If the electric machine is provided axially offset with respect to the planetary gear sets, however, a coupling takes place via one or multiple intermediate gear stage(s) and/or a flexible traction drive mechanism. The one or the multiple gear stage(s) can also be implemented individually, in this case, either as a spur gear stage or as a planetary gear stage. A flexible traction drive mechanism can be either a belt drive or a chain drive.

If a further electric machine is also provided, a rotor of this further electric machine can also be either rotationally fixed to the first input shaft directly or can be coupled to the first input shaft via at least one gear stage. The at least one gear stage can be a spur gear stage or a planetary gear stage or also a flexible traction drive mechanism. In addition, the further electric machine can be provided coaxially or also axially offset with respect to the first input shaft and, thereby, also to the planetary gear sets.

Within the scope of example aspects of the invention, a starting component can be installed upstream from the transmission, for example a hydrodynamic torque converter or a friction clutch. This starting component can then also be an integral part of the transmission and acts to configure a starting process, in that the starting component enables a slip speed between the prime mover, which is designed, in particular, as an internal combustion engine, and the first input shaft of the transmission. In this case, one of the shift elements of the transmission or the separating clutch, which may be present, can also be designed as such a starting component, in that it is present as a frictional shift element. In addition, a one-way clutch with respect to the transmission housing or to another shaft can be arranged on each shaft of the transmission, in principle.

The transmission according to the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the first input shaft of the transmission is either permanently coupled to a crankshaft of the internal combustion engine or to the rotor shaft of the electric machine in a rotationally fixed manner or can be connected thereto via an intermediate separating clutch or a starting component, wherein a torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" or "are connected to each other" mean a permanent coupling of these components, and therefore said components cannot rotate independently of each other. In that respect, no shift element is provided between these components, which can be elements of the planetary gear sets and/or also shafts and/or a rotationally fixed component of the transmission. Instead, the appropriate components are coupled to each other with a constant rotational speed dependence.

However, if a shift element is provided between two components, these components are not permanently coupled to each other. Instead, a coupling is carried out only by actuating the intermediate shift element. In this case, an actuation of the shift element means, within the meaning of the invention, that the particular shift element is transferred into an engaged condition and, consequently, synchronizes the turning motions, if necessary, of the components connected directly thereto. In the case of an example embodiment of the particular shift element as a form-locking shift element, the components directly connected to each other in a rotationally fixed manner via the shift element rotate at the same rotational speed, while, in the case of a force-locking shift element, speed differences can exist between the components also after an actuation of the same shift element. This intentional or also unintentional condition is nevertheless referred to, within the scope of the invention, as a rotationally fixed connection of the particular components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference signs is not intended to limit the scope of protection of the claims.

BRIEF DESCRIPTION OF THE DRAWINGS

Advantageous example embodiments of the invention, which are explained in the following, are represented in the drawings. Wherein:

FIG. 6 shows an exemplary shift pattern for five shift elements of the transmissions from FIGS. 2 through 5;

FIG. 7 shows an exemplary shift pattern for six shift elements of the transmissions from FIGS. 2 through 5;

FIG. 10 shows an exemplary shift pattern for a transmission according to FIG. 8 or 9;

FIGS. 18 through 22 show an exemplary actuating unit for a transmission.

DETAILED DESCRIPTION

Figure 1:
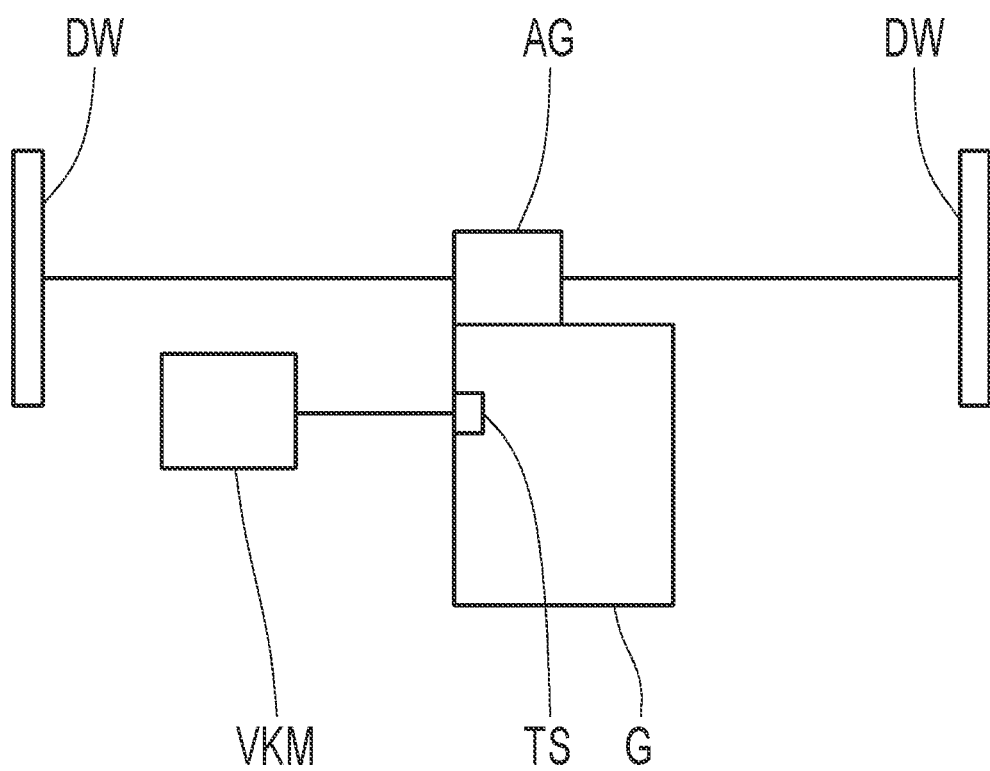
FIG. 1 shows a diagrammatic view of a motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW of a drive axle of the motor vehicle. The transmission G and the torsional vibration damper TS are arranged in a common housing of the transmission G in this case, into which the differential gear AG can then also be integrated. As is also apparent in FIG. 1, the internal combustion engine VKM, the torsional vibration damper TS, the transmission G, and also the differential gear AG are aligned transversely to a direction of travel of the motor vehicle.

Figure 2:
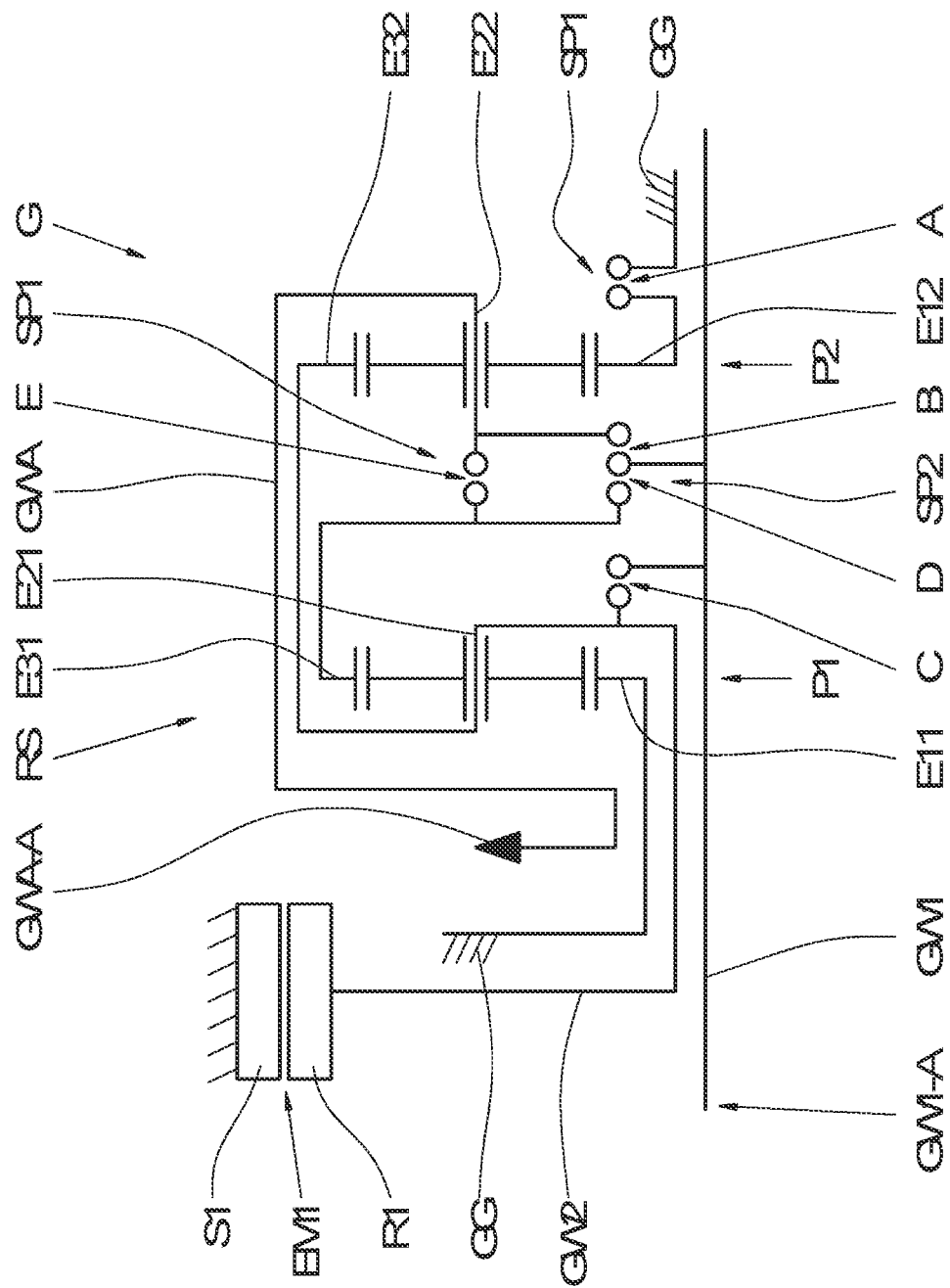
FIGS. 2 through 5 each show a diagrammatic view of a transmission of the type that can be utilized in the motor vehicle drive train from FIG. 1.

FIG. 2 shows a schematic of the transmission G according to a first example embodiment of the invention. As is apparent, the transmission G includes a gear set RS and an electric machine EM1, which are both arranged in the housing of the transmission G. The gear set RS includes two planetary gear sets P1 and P2, wherein each of the planetary gear sets P1 and P2 includes a first element E11 and E12, respectively, a second element E21 and E22, respectively, and a third element E31 and E32, respectively. The first element E11 and E12 is formed by a sun gear of the planetary gear set P1 and P2, respectively, while the second element E21 and E22 of the planetary gear set P1 and P2, respectively, is present as a planet carrier, and the third element E31 and E32 of the planetary gear set P1 and P2, respectively, is present as a ring gear.

In the present case, the first planetary gear set P1 and the second planetary gear set P2 are each therefore present as a minus planetary gear set. The particular planet carrier thereof guides at least one planet gear in a rotatably mounted manner; the planet gear is meshed with the particular radially internal sun gear as well as with the particular radially surrounding ring gear. It is particularly preferred, however, when multiple planet gears are provided in the case of the first planetary gear set P1 and in the case of the second planetary gear set P2.

As is apparent in FIG. 2, the transmission G includes a total of five shift elements in the form of a first shift element A, a second shift element B, a third shift element C, a fourth shift element D, and a fifth shift element E. The shift elements A, B, C, D, and E are each designed as form-locking shift elements and are preferably present as constant-mesh shift elements. While the first shift element A is a brake, the remaining shift elements B, C, D, and E are clutches.

The first element E11 of the first planetary gear set P1 is permanently fixed at a rotationally fixed component GG, which is the transmission housing of the transmission G or a portion of this transmission housing. The second element E22 of the second planetary gear set P2 is rotationally fixed to an output shaft GWA of the transmission G. Jointly, the second element E22 of the second planetary gear set P2 and, thereby, also the output shaft GWA, is connectable in a rotationally fixed manner to a first input shaft GW1 of the transmission G by engaging the second shift element B and connectable in a rotationally fixed manner to the third element E31 of the first planetary gear set P1 by engaging the fifth shift element E.

As is also apparent in FIG. 2, the first input shaft GW1 is connectable in a rotationally fixed manner to the second element E21 of the first planetary gear set P1 via the third shift element C. A second input shaft GW2 of the transmission G is permanently rotationally fixed to the second element E21 of the first planetary gear set P1 and to a rotor R1 of an electric machine EM1, the stator S1 of which is continuously fixed at the rotationally fixed component GG. Since the rotor R1 is connected to the second input shaft GW2 and the second input shaft GW2 is rotationally fixed to the second element E21, a connection of the input shaft GW1 to the second input shaft GW2 takes place simultaneously by engaging the third shift element C.

By actuating the second shift element B, the input shaft GW1 is connectable to the second element E22 of the second planetary gear set P2 and, thereby, to the output shaft GWA.

By actuating the fourth shift element D, the first input shaft GW1 also is connectable in a rotationally fixed manner to the third element E31 of the first planetary gear set P1.

The first input shaft GW1 as well as the output shaft GWA form a mounting interface GW1-A and GWA-A, respectively, wherein the mounting interface GW1-A in the motor vehicle drive train from FIG. 1 is utilized for a connection at the internal combustion engine VKM, while the transmission G is connected at the mounting interface GWA-A to the downstream differential gear AG. The mounting interface GW1-A of the first input shaft GW1 is formed at an axial end of the transmission G, while the mounting interface GWA-A of the output shaft GWA is situated in the area of the same axial end and, here, is aligned transversely to the mounting interface GW1-A of the first input shaft GW1. In addition, the first input shaft GW1, the second input shaft GW2, and the output shaft GWA are arranged coaxially to one another.

The planetary gear sets P1 and P2 are also situated coaxially to the input shafts GW1 and GW2 and the output shaft GWA, wherein the planetary gear sets P1 and P2 are arranged in the sequence first planetary gear set P1 and second planetary gear set P2 axially subsequent to the mounting interface GW1-A of the first input shaft GW1. Likewise, the electric machine EM1 is also located coaxially to the planetary gear sets P1 and P2 and, thereby, also to the input shafts GW1 and GW2 and to the output shaft GWA, wherein the electric machine EM1 is arranged axially spaced apart from the first planetary gear set P1 and the second planetary gear set P2.

As is also apparent from FIG. 2, the second shift element B, the third shift element C, the fourth shift element D, and the fifth shift element E are arranged axially between the first planetary gear set P1 and the second planetary gear set P2, wherein, in this case, the third shift element C is situated axially adjacent to the first planetary gear set P1, followed axially initially by the fourth shift element D and then the second shift element B and the fifth shift element E. The fifth shift element E is arranged axially approximately at the level of the fourth shift element D and the second shift element B and radially spaced apart therefrom.

The first shift element A is situated axially on a side of the second planetary gear set P2 facing away from the first planetary gear set P1.

The first shift element A and the fifth shift element E include a common actuating element, via which the first shift element A, on the one hand, and the fifth shift element E, on the other hand, can be actuated from a neutral position. In that respect, the first shift element A and the fifth shift element E are combined to form a shift element pair SP1.

The fourth shift element D and the second shift element B are situated axially directly next to one another and radially at the same level and are combined to form a shift element pair SP2, in that a common actuating element is associated with the fourth shift element D and the second shift element B, via which the fourth shift element D, on the one hand, and the second shift element B, on the other hand, can be actuated from a neutral position. Alternatively, the shift elements B and C as well as C and D can be combined to form a shift element pair.

Figure 3:
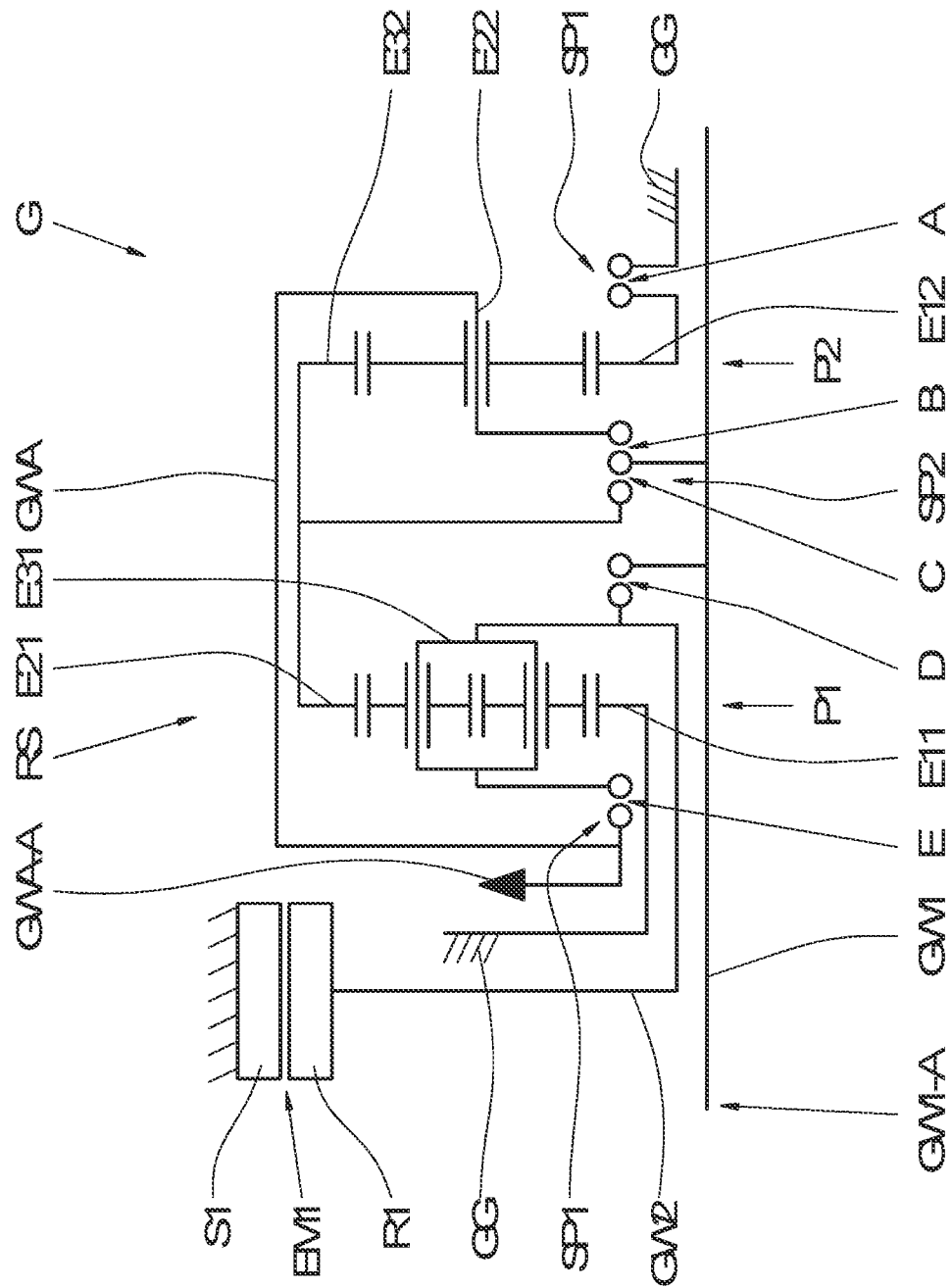

Moreover, FIG. 3 shows a diagrammatic view of a transmission G according to a second example design option of the invention, which can also be utilized in the motor vehicle drive train from FIG. 1. This example design option largely corresponds to the preceding example variant according to FIG. 2, with the difference that the first planetary gear set P1 is now designed as a plus planetary gear set.

As compared to the design as a minus planetary gear set, the particular second element E21 is formed by the ring gear and the third element E31 is formed by the planet carrier. In addition, the stationary transmission ratio is increased by one. In the plus planetary gear set P1, the planet carrier guides at least one pair of planet gears in a rotatably mounted manner. One planet gear of said pair of planet gears is meshed with the radially internal sun gear and one planet gear is meshed with the radially surrounding ring gear, and the planet gears intermesh with each other. In order to connect the first input shaft GW1 at the second input shaft GW2, the fourth shift element D must be actuated in the example embodiment according to FIG. 3.

As in the example embodiment according to FIG. 2, the shift elements A and E are combined to form a shift element pair SP1. In contrast to the example embodiment according to FIG. 2, the shift element pair is formed by the shift elements B and C, wherein the other two example variants would also be conceivable here.

The example design of the first planetary gear set in the "plus variant" has the advantage that, due to the connection of the rotor R1 at the other shaft, the electric gears now have a shorter ratio, which increases the tractive force in the electric mode. In addition, a pre-ratio of the electric machine EM1, if present, can be smaller and can even be omitted, if necessary. Otherwise, the example design option according to FIG. 3 corresponds to the example variant according to FIG. 2, and therefore reference is made to the description thereof.

Figure 4:
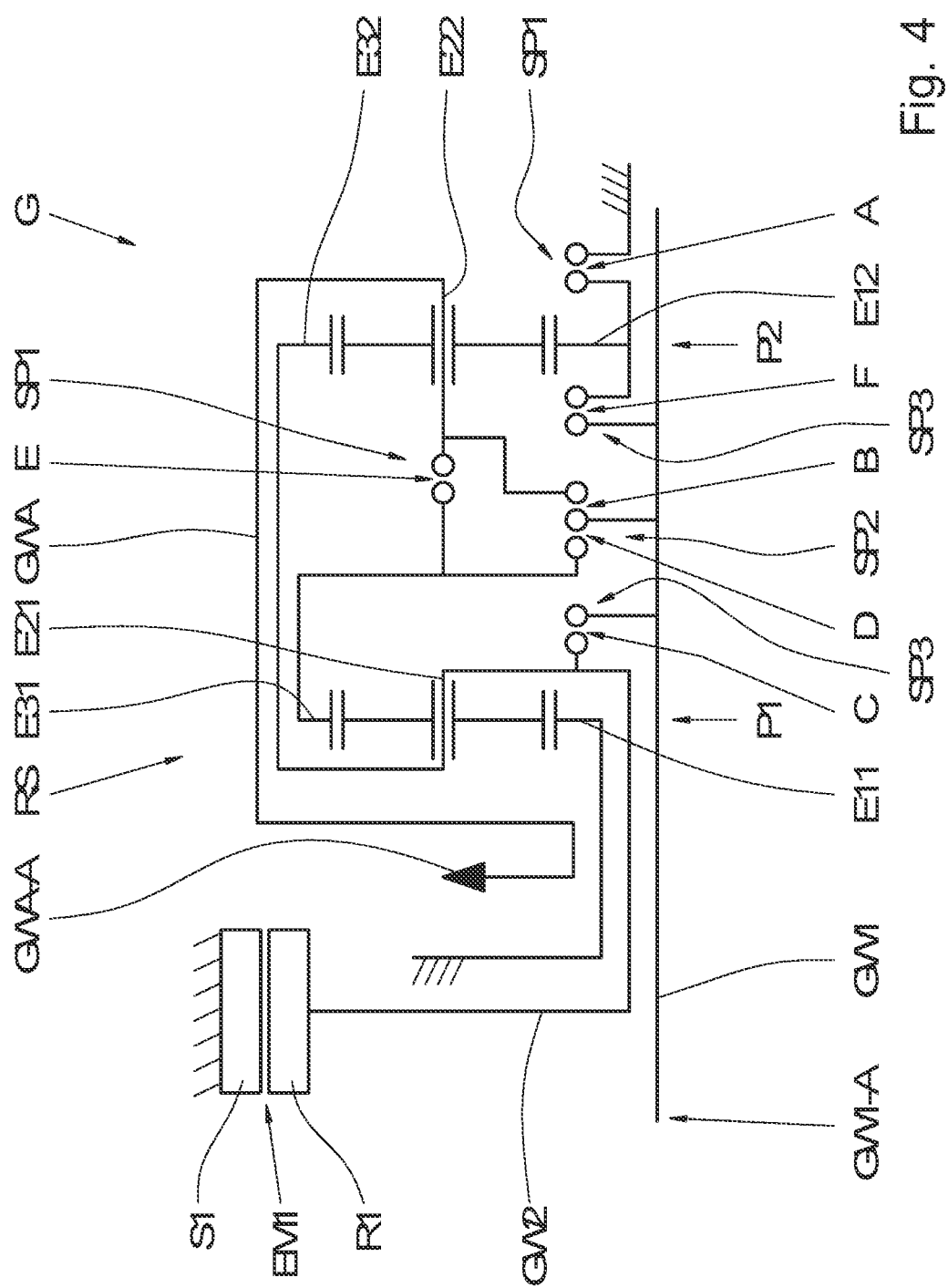

FIG. 4 shows a schematic of a transmission G according to a third example embodiment of the invention, of the type which can also be utilized in the motor vehicle drive train from FIG. 1. This example embodiment also essentially corresponds to the example variant according to FIG. 2, wherein, in contrast thereto, a sixth shift element F is now provided. By actuating the sixth shift element F, the first input shaft GW1 is connected in a rotationally fixed manner to the first element E12 of the second planetary gear set P2. The sixth shift element F is provided axially between the first planetary gear set P1 and the second planetary gear set P2.

By adding the sixth shift element F, an EDA mode for the electrodynamic starting operation forward can be advantageously implemented. With the sixth shift element F engaged, the internal combustion engine VKM is connected to the first element E12 of the second planetary gear set P2, the rotor R1 is connected to the third element E32 of the second planetary gear set P2, while the output shaft GWA is connected to the second element E22 of the second planetary gear set P2.

In this preferred example embodiment, the six shift elements are combined to form shift element pairs as follows.

Shift elements A and B form a first shift element pair SP1.

Shift elements B and D form a second shift element pair SP2.

Shift elements C and F form a third shift element pair SP3.

For the rest, the example embodiment according to FIG. 4 corresponds to the example variant according to FIG. 2, and therefore reference is made to the description thereof. With respect to the actuation of the four shift elements B, C, D, and F by only two actuators, reference is made to the example embodiment according to FIGS. 17 through 22.

Figure 5:
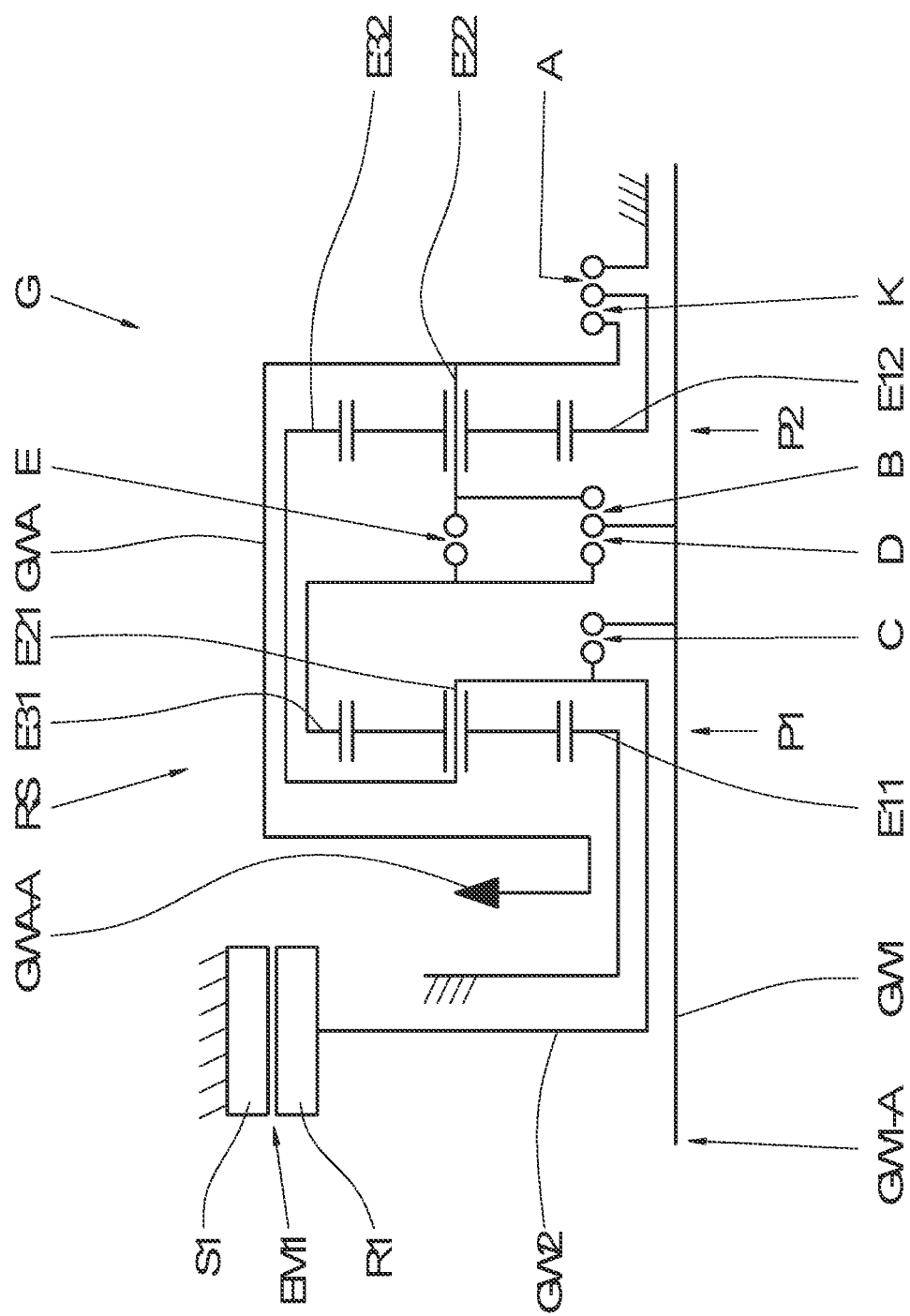

FIG. 5 shows a diagrammatic view of a transmission G according to a fourth example design option of the invention, which can also be utilized in the motor vehicle drive train from FIG. 1. This example design option largely corresponds to the example variant according to FIG. 2, with the difference that a seventh shift element K is provided, which, in the actuated condition, interlocks the second planetary gear set P2. According to the example embodiment according to FIG. 5, the interlock of the second planetary gear set P2 takes place by connecting the first element E12 and the second element E22 in a rotationally fixed manner.

Not represented, but also conceivable is an interlock by connecting, in a rotationally fixed manner, the first element E12 and the third element E32 as well as the second element E22 and the third element E32 of the second planetary gear set P2.

The seventh shift element K allows for an additional electric gear, in that the seventh shift element is engaged. The additional electric gear can also be combined with an example embodiment according to FIG. 3 (plus gear set variant) and with the example embodiment according to FIG. 4 (EDA mode forward). For the rest, the example embodiment according to FIG. 4 corresponds to the example variant according to FIG. 2, and therefore reference is made to the description thereof.

FIG. 6 shows an exemplary shift pattern for the transmissions G from FIGS. 2 through 5 in table form. As is apparent, a total of four gears 1 through 4, which differ in terms of the ratio, are implementable between the first input shaft GW1 and the output shaft GWA, wherein, in the columns of the shift pattern, an X indicates which of the shift elements A through E is engaged in which of the gears 1 through 4.

As is apparent in FIG. 6, a first gear 1 is engaged between the first input shaft GW1 and the output shaft GWA by actuating the first shift element A and the fourth shift element D. Moreover, a second gear results between the first input shaft GW1 and the output shaft GWA by engaging the first shift element A and the third shift element C.

In addition, a third gear can be implemented between the first input shaft GW1 and the output shaft GWA in a first variant 3.1 by actuating the first shift element A and the second shift element B, wherein the third gear can also be formed in a second variant 3.2 by engaging the second shift element B and the fifth shift element E, in a third variant 3.3 by actuating the fourth shift element D and the fifth shift element E, in a fourth variant 3.4 by engaging the second shift element B and the third shift element C, and in a fifth variant by engaging the second shift element B and the fourth shift element D. In one further variant (V3), the third gear can be implemented simply by engaging the second shift element B.

While the electric machine EM1 is also integrated in each of the variants 3.1 through 3.5, and so driving can take place in a hybrid manner while simultaneously utilizing the internal combustion engine VKM and the electric machine EM1, the electric machine EM1 is decoupled in the case of the further variant V3. The latter has the advantage that the electric machine EM1 does not need to be engaged during operation.

In addition, a fourth gear also results between the first input shaft GW1 and the output shaft GWA by actuating the third shift element C and the fifth shift element E.

Although the shift elements A through E are each designed as form-fit shift elements, a power shift can be implemented between the first gear 1 and the second gear 2, between the first variant 2.1 of the second gear and the first variant 3.1 of the third gear, and between the second variant 3.2 of the third gear and the fourth gear 4. The reason therefor is that the first shift element A contributes to the changeover from the second gear 2 into the first variant 3.1 and to the changeover from the first variant 3.1 into the second variant 3.2. The shift element E contributes to the changeover from the second variant 3.2 of the third gear to the fourth gear 4. A synchronization during the gear shifts can take place in each case via an appropriate closed-loop control of the upstream internal combustion engine VKM, and therefore the particular shift element to be disengaged is disengaged without load and the shift element to be subsequently engaged can be engaged without load.

The transmissions G from FIGS. 2 through 5 can also be operated in alternative operating modes with the aid of the electric machine EM1. Purely electric driving can take place in a first gear E2, which is effective between the second input shaft GW2 and the output shaft GWA and, for the implementation of which, the first shift element A is to be transferred into an engaged condition. As a result, with the first shift element A engaged, the first electric machine EM1 is directly connected to the output shaft GWA with a constant ratio (third element E32 rotatable with the second element E22 while the first element E12 of the second planetary gear set P2 is fixed). The ratio of the first gear E2 corresponds here, in each case, to a ratio of the second gear 2 between the first input shaft GW1 and the output shaft GWA.

In addition, a second gear E4 can also be implemented between the second input shaft GW2 and the output shaft GWA, for the implementation of which the fifth shift element E is to be engaged. As a result, the electric machine EM1 is connected to the output shaft GWA with a constant ratio (second element E21 rotatable with the third element E31 while the first element E11 of the first planetary gear set P1 is fixed). A ratio of this second gear E4 corresponds, in each case, to a ratio of the fourth gear 4, which is effective between the first input shaft GW1 and the output shaft GWA.

Advantageously, a start of the internal combustion engine VKM into the first gear 1, into the second gear 2, and into the first variant 3.1 of the third gear 3 can be carried out starting from the first gear E2, since the first shift element A is engaged in each of these gears. The same is possible from the second gear E4 into the second variant 3.2 of the third gear, into the third variant 3.3 of the third gear, or into the fourth gear 4, since the fifth shift element E contributes to each of these gears. Therefore, a transition from purely electric driving into driving via the internal combustion engine or into hybrid driving can be carried out rapidly.

Moreover, a charging or starting function can be implemented by engaging the third shift element C. This is the case because, in the engaged condition of the third shift element C, the second input shaft GW2 is directly coupled, in a rotationally fixed manner, to the first input shaft GW1 and, thereby, also to the internal combustion engine VKM, wherein, simultaneously, there is no force-fit connection to the output shaft GWA. When the electric machine EM1 is operated as a generator, an electric accumulator can be charged via the internal combustion engine VKM, whereas, when the electric machine EM1 is operated as an electric motor, a start of the internal combustion engine VKM is implementable via the electric machine EM1.

In addition, a rotational-speed reduction of the electric machine EM1 can be configured in the mechanical or hybrid mode. After a gear shift from the second gear into the third gear, with torque support via the electric machine EM1, or after a start of the internal combustion engine VKM into the third gear, hybrid driving results.

In order to reduce the rotational speed of the electric machine EM in the third gear at higher ground speeds, a changeover can be carried out from the first variant 3.1 of the third gear into the second variant 3.2, in which the rotor R1 has a lower rotational speed. This changeover takes place while obtaining the tractive force via the internal combustion engine VKM with the second shift element B engaged. For this purpose, the first shift element A, which is then load-free, is disengaged and the likewise load-free, fifth shift element E is engaged, wherein the rotational-speed adaptation takes place in each case via closed-loop control of the rotational speed of the electric machine EM.

The changeover into the second variant 3.2 also has the advantage that the internal combustion engine VKM can be decoupled at any time by disengaging the second shift element B also in the absence of an additional separating clutch, while the electric machine EM1 drives or decelerates the vehicle. Moreover, in the case of a vehicle that is slowing down, a downshift from the third gear into the second gear can be prepared, in that, initially, a changeover takes place from the second variant 3.1 into the first variant 1.1, while the internal combustion engine VKM maintains the tractive force with the second shift element B engaged. In the first variant 3.1 of the third gear, the first shift element A is engaged, which becomes necessary in order to support the tractive force via the electric machine EM during the downshift from the third gear into the second gear.

FIG. 7 shows an exemplary shift pattern for the transmissions G from FIGS. 2 through 5 with a sixth shift element F, in table form. As is apparent, a total of four gears 1 through 4, which differ in terms of the ratio, are implementable between the first input shaft GW1 and the output shaft GWA, wherein, in the columns of the shift pattern, an X indicates which of the shift elements A through F is engaged in which of the gears 1 through 4.

In contrast to the shift pattern from FIG. 6, two further variants of a third gear, which is effective between the first input shaft GW1 and the output shaft GWA, result due to the sixth shift element F. A sixth variant 3.6 of the third gear results by actuating the second shift element B and the sixth shift element F, whereas a seventh variant 3.7 of the third gear results by actuating the third shift element C and the sixth shift element F.

As is also apparent from FIG. 7, two additional gears Z1 and Z2 are engageable. The additional gear Z1 results by actuating the fourth shift element D and the sixth shift element F, whereas the additional gear Z2 results by actuating the fifth shift element E and the sixth shift element F. Therefore, a total of four additional hybrid forward gears result due to the sixth shift element.

Figure 8:
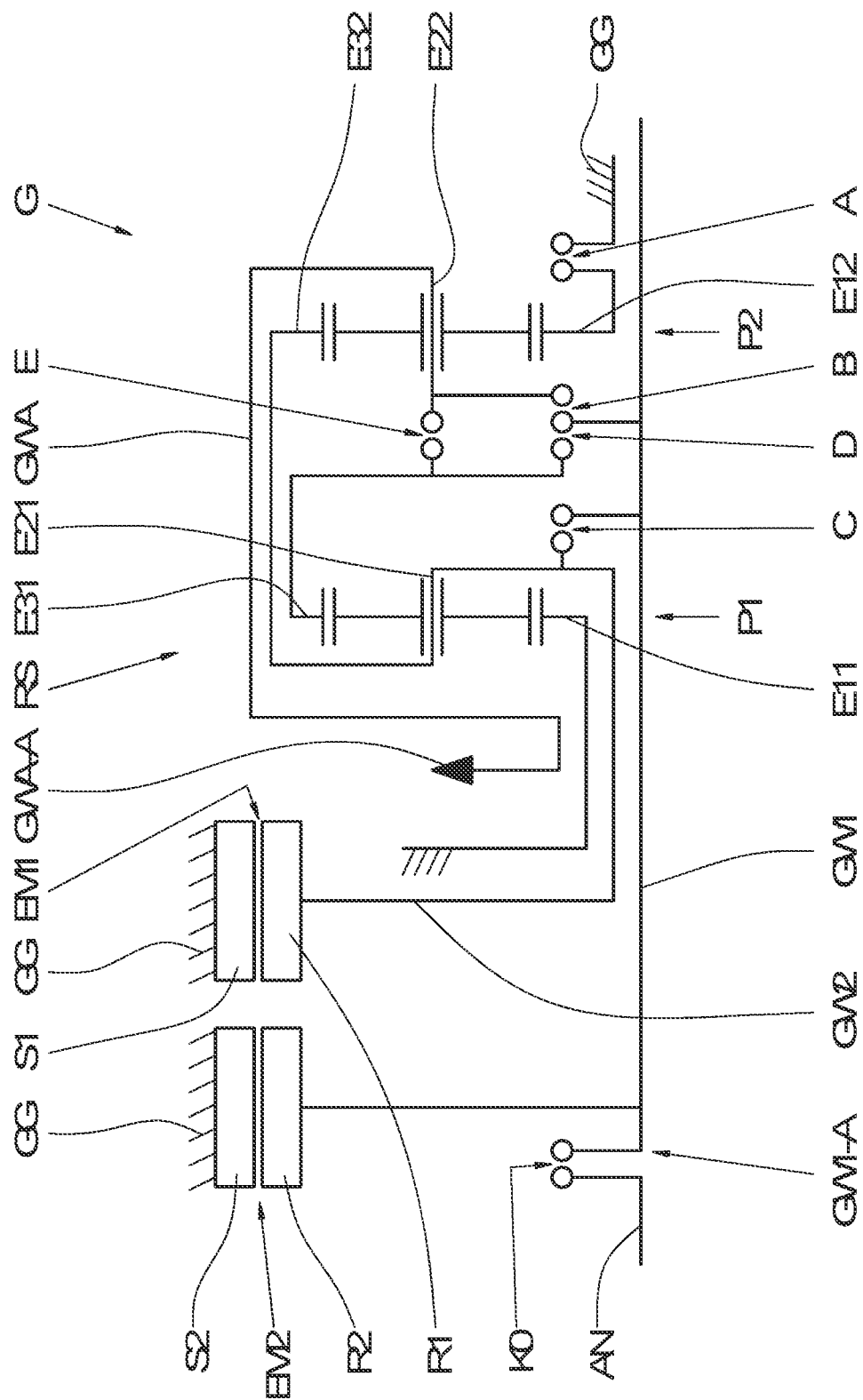
FIGS. 8 and 9 each show a diagrammatic view of a transmission of the type that can also be utilized in the motor vehicle drive train from FIG. 1.

Moreover, FIG. 8 shows a schematic of a transmission G according to a fifth example embodiment of the invention, of the type which can also be utilized in the motor vehicle drive train from FIG. 1. This example embodiment essentially corresponds to the example variant according to FIG. 2, wherein, in contrast thereto, the first input shaft GW1 is now rotationally fixable, at the mounting interface GW1-A via an eighth shift element K0, to a connection shaft AN, which is then connected to the upstream internal combustion engine VKM in the motor vehicle drive train. The seventh shift element K0 is configured as a form-locking shift element and, particularly preferably, is present as a constant-mesh shift element. Moreover, a further electric machine EM2 is also provided, the rotor R2 of which is rotationally fixed to the first input shaft GW1, while a stator S2 of the further electric machine EM2 is fixed at the rotationally fixed component GG. The rotor R2 is connected at the first input shaft GW1 axially between the seventh shift element K0 and the first planetary gear set P1. For the rest, the example variant according to FIG. 8 corresponds to the example design option according to FIG. 2, and therefore reference is made to the description thereof.

Figure 9:
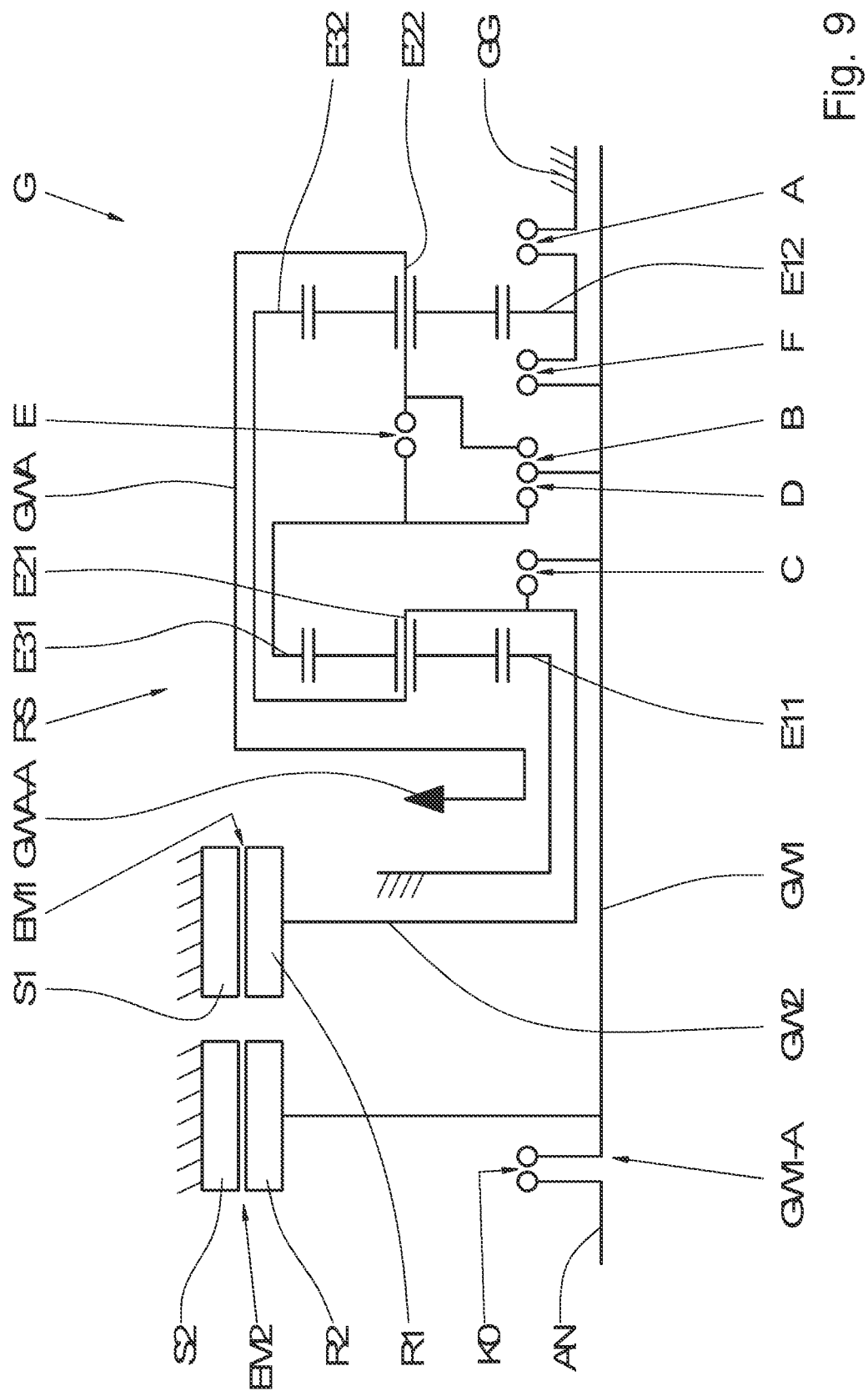

FIG. 9 shows a diagrammatic view of a transmission G according to a sixth example design option of the invention. This example design option can also be utilized in the motor vehicle drive train from FIG. 1, wherein the example design option largely corresponds to the example variant from FIG. 4. The difference now, however, is that the first input shaft GW1 can be connected, at the mounting interface GW1-A, as is also the case in the preceding example variant according to FIG. 8, via an eighth shift element K0 in a rotationally fixed manner to a connection shaft AN, which is then connected to the upstream internal combustion engine VKM in the motor vehicle drive train. In this case, the eighth shift element K0 is designed as a form-locking shift element and, in this case, preferably as a constant-mesh shift element. In addition, a further electric machine EM2 is also provided, the rotor R2 of which is rotationally fixed to the first input shaft, while a stator S2 of the further electric machine EM2 is fixed at the rotationally fixed component GG. A connection of the rotor R2 of the further electric machine EM2 at the first input shaft GW1 is implemented axially between the eighth shift element K0 and the first planetary gear set P1. Otherwise, the example variant according to FIG. 9 corresponds to the example embodiment according to FIG. 4, and therefore reference is made to the description thereof.

In FIG. 10, different conditions of the motor vehicle drive train from FIG. 1, with utilization of the transmission G from FIG. 8 or 9, are represented in table form, wherein these different conditions are achieved via different integrations of the two electric machines EM1 and EM2 and the internal combustion engine VKM. The column with the sixth shift element F is relevant only for the transmission according to FIG. 9.

First, purely electric driving by a single electric machine and disengaged shift element K0 is described.

In the first gear E2, purely electric driving takes place via the electric machine EM1, in that the first gear E2 is implemented in the transmission G in the way described above with respect to FIG. 6. In the second gear E4, purely electric driving also takes place via the electric machine EM1, in that the second gear E4 is implemented in the transmission G in the way described above with respect to FIG. 6. In the third gear E3, purely electric driving takes place via the electric machine EM2, in that the third gear E3 is implemented in the transmission G by actuating the second shift element B.

Second, purely electric driving by both electric machines and disengaged shift element K0 is described.

The same gear steps can be implemented as described in FIGS. 5 and 6, wherein these can now be driven purely electrically.

Starting at the gear E1, driving then takes place via the electric machine EM1 and via the second electric machine EM2, in that both electric machines EM1 and EM2 are jointly integrated via the selection of the appropriate gears in the transmission G. A first gear E1 is selected by engaging the shift elements A and D. A second gear E2 is selected by engaging the shift elements A and C. A third gear in a first variant E3.1 is selected by engaging the shift elements A and B. A second variant E3.2 of the third gear is selected by engaging the shift elements B and E. A third variant E3.3 of the third gear is selected by engaging the shift elements D and E. By engaging the shift elements B and C, a fourth variant E3.4 of the third gear is selected. A fifth variant E3.5 of the third gear is selected by engaging the shift elements B and D. A sixth variant E3.6 of the third gear is selected by engaging the shift elements B and F. A seventh variant E3.7 of the third gear is selected by engaging the shift elements C and F. A fourth gear E4 is selected by engaging the shift elements C and E. The additional forward gear EZ1 is selected by engaging the shift elements D and F. The additional forward gear EZ2 is selected by engaging the shift elements E and F.

With the clutch K0 engaged, the same gears are also implementable as described in FIGS. 6 and 7.

The advantages of two electric machines can be summarized as follows:
- purely electric powershift, since the second electric machine EM2, with disengaged shift element K0, performs the functions of the internal combustion engine;
- the second electric machine EM2, with disengaged shift element K0, can be utilized for synchronization, while the first electric machine EM1 supports the tractive force;
- a greater total electrical power is implementable with disengaged shift element K0;
- a greater range is possible in a hybrid operation;
- the internal combustion engine VKM can be started by the second electric machine EM2;
- the second electric machine EM2 can synchronize the shift element K0;
- a battery-independent serial operation is possible; and
- the second electric machine EM2 can be used as a generator, the first electric machine EM1 can be used as a motor.

Due to the additional shift element F, as described above, an EDA mode for forward travel can be implemented.

In addition, a purely electric EDA mode can be implemented. As a result, driving can also take place for a longer time with high torque and a low ground speed without the electric machine or the inverter overheating, since both electric machines can be operated at suitable rotational speeds. An operation at very low electric-machine rotational speeds is avoided.

In addition, in the purely electric EDA mode, a purely electric gear shift (EDS) is possible (K0 is disengaged while the shift element F is engaged), i.e., the electric gears of the first electric machine EM1 are power shiftable among one another. It is advantageous here that the first electric machine EM1 also contributes the greatest portion of the drive power during the gear shift, while the second electric machine EM2 can therefore be dimensioned considerably smaller (for example, only approximately a third (⅓) the power of EM1).

With the clutch K0 engaged, the same shift conditions are implementable during hybrid travel and during internal combustion engine-driven travel, as explained with respect to FIGS. 6 and 7, and so reference is made to the descriptions thereof.

The electric machines EM1 and EM2 can be positioned either coaxially to the gear set as well as axially parallel to the input shaft. The electric machines can be connected to the particular transmission shaft directly or via further gear stages, such as a planetary gear set or a spur gear stage. An additional gear stage can be useful, therefore, in order to obtain a more favorable design of the particular electric machine. In this way, for example, a higher rotational speed and a lower torque can be achieved.

Finally, FIGS. 11 through 16 show modifications of the example transmissions G from FIGS. 2 through 5 as well as FIGS. 8 and 9. These example modifications relate to alternative possibilities for integrating the electric machine EM1, although the example modifications can also be utilized, in a similar way, for the further electric machine EM2 in the transmissions G according to FIGS. 8 and 9.

Figure 11:
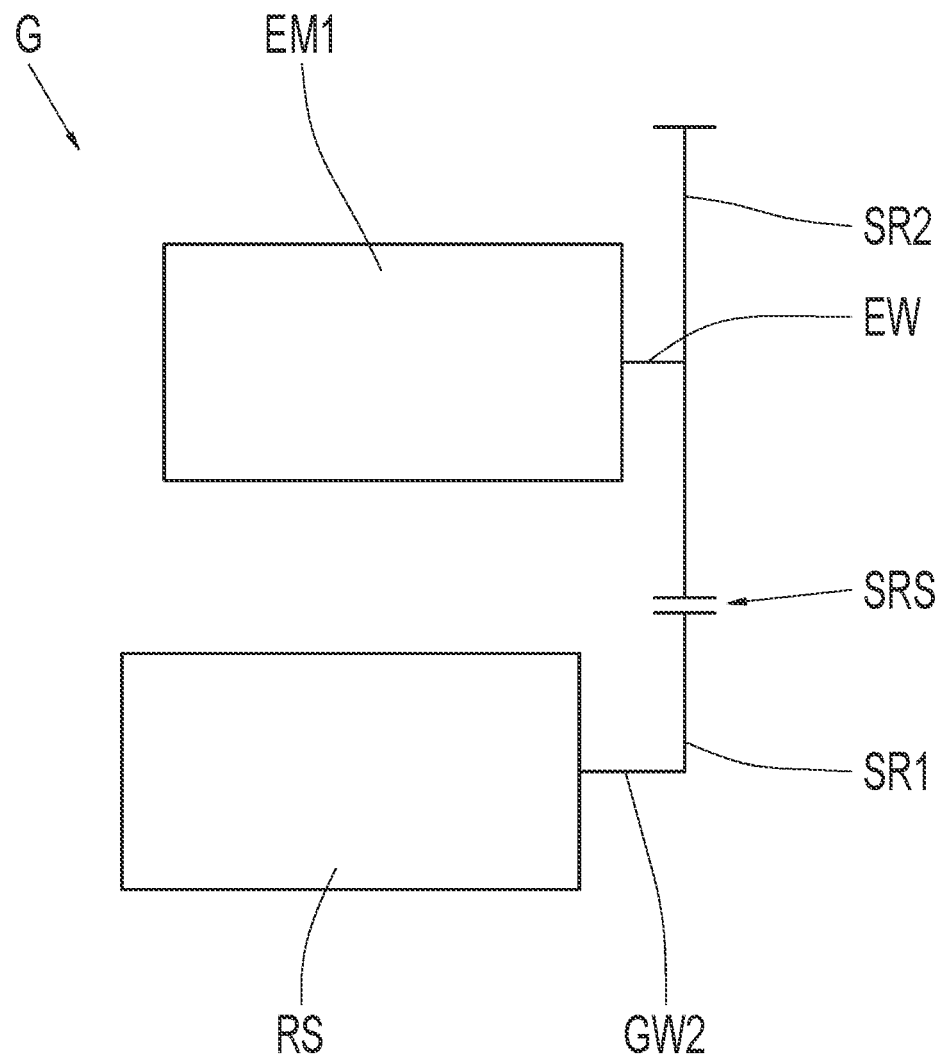
FIGS. 11 through 16 each show a schematic of a modification of the transmissions from FIGS. 2 through 5 as well as FIGS. 8 and 9.

In FIG. 11, for example, the electric machine EM1 is not located coaxially to the particular gear set RS (not represented in greater detail here) of the transmission G, but rather is arranged axially offset with respect thereto. A connection takes place via a spur gear stage SRS, which is composed of a first spur gear SR1 and a second spur gear SR2. The first spur gear SR1 is connected at the second input shaft GW2 in a rotationally fixed manner on the side of the particular gear set RS. The spur gear SR1 then meshes with the spur gear SR2, which is located on an input shaft EW of the electric machine EM1 in a rotationally fixed manner. Within the electric machine EM1, the input shaft EW establishes the connection at the rotor (not represented further in this case) of the electric machine EM1.

Figure 12:
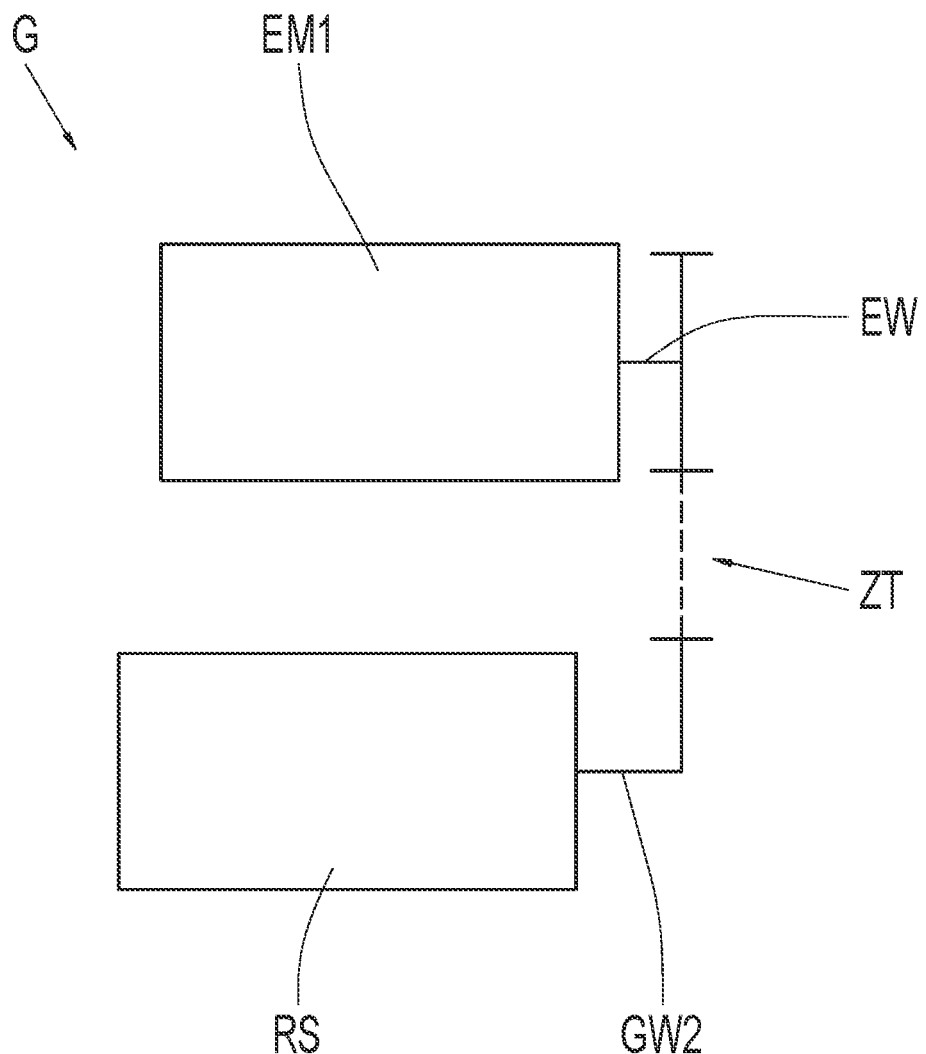

In the case of the example modification according to FIG. 12 as well, the electric machine EM1 is located axially offset with respect to the particular gear set RS of the particular transmission G. In contrast to the preceding example variant according to FIG. 11, a connection is not established in this case via a spur gear stage SRS, however, but rather via a flexible traction drive mechanism ZT. This flexible traction drive mechanism ZT can be configured as a belt drive or also a chain drive. The flexible traction drive mechanism ZT is then connected at the second input shaft GW2 on the side of the particular gear set RS. Via the flexible traction drive mechanism ZT, a coupling to an input shaft EW of the electric machine EM1 is then established. Within the electric machine EM1, the input shaft EW establishes a connection at the rotor of the electric machine.

Figure 13:
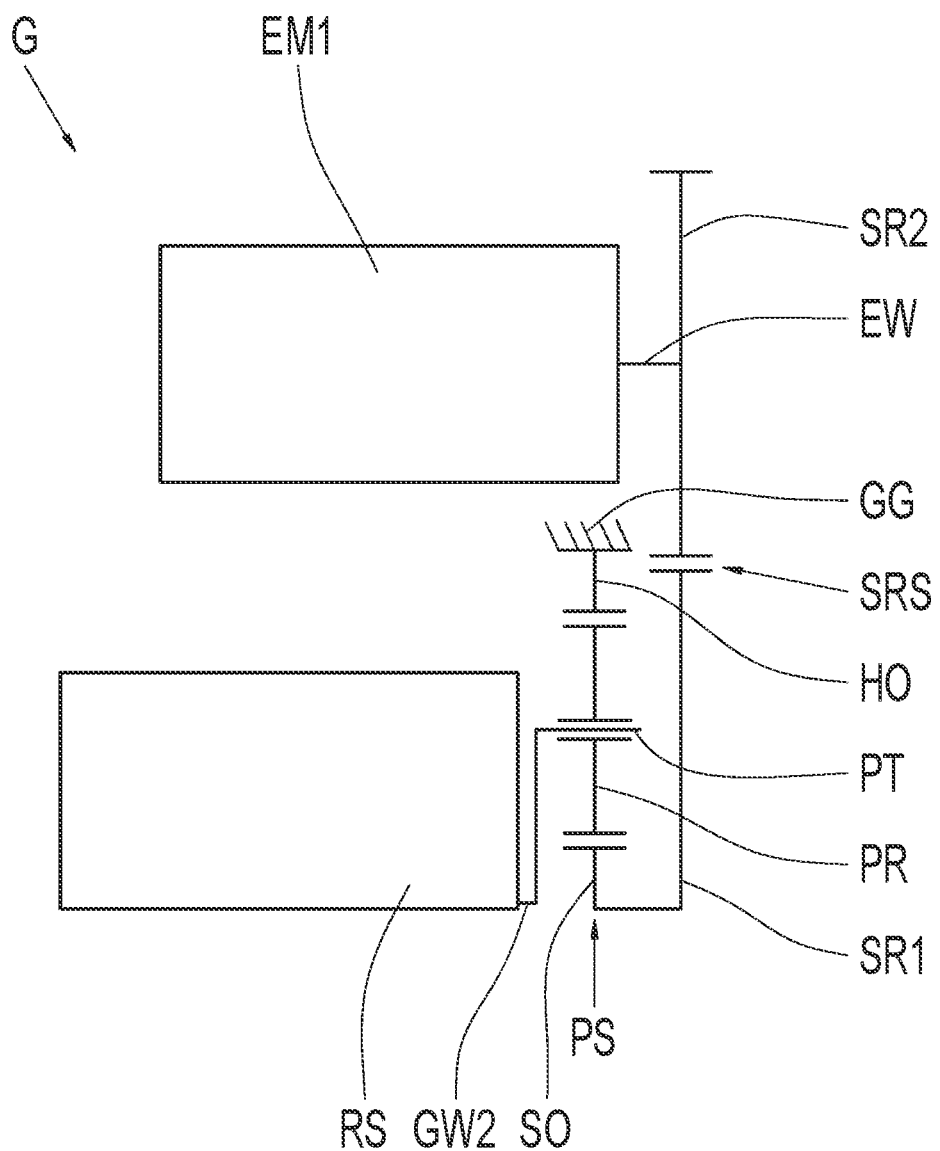

In the case of the example modification according to FIG. 13, an integration of the electric machine EM1, which is located axially offset with respect to the particular gear set RS, is implemented via a planetary gear stage PS and a spur gear stage SRS. The planetary gear stage PS is connected downstream from the gear set RS, wherein, on the output end of the planetary gear stage PS, the spur gear stage SRS is then provided, via which the connection to the electric machine EM1 is established. The planetary gear stage PS includes a ring gear HO, a planet carrier PT, and a sun gear SO, wherein the planet carrier PT guides, in a rotatably mounted manner, at least one planet gear PR, which is meshed with the sun gear SO as well as with the ring gear HO.

In the present case, the planet carrier PT is connected at the second input shaft GW2 in a rotationally fixed manner on the side of the gear set RS from FIGS. 2 through 5 as well as FIGS. 8 and 9. By comparison, the ring gear HO is permanently fixed at the rotationally fixed component GG, while the sun gear SO is rotationally fixed to a first spur gear SR1 of the spur gear stage SRS. The first spur gear SR1 then intermeshes with a second spur gear SR2 of the spur gear stage SRS, which is provided, in a rotationally fixed manner, on an input shaft EW of the electric machine EM1. In this case, the electric machine EM1 is therefore connected by the gear set RS via two gear stages.

Figure 14:
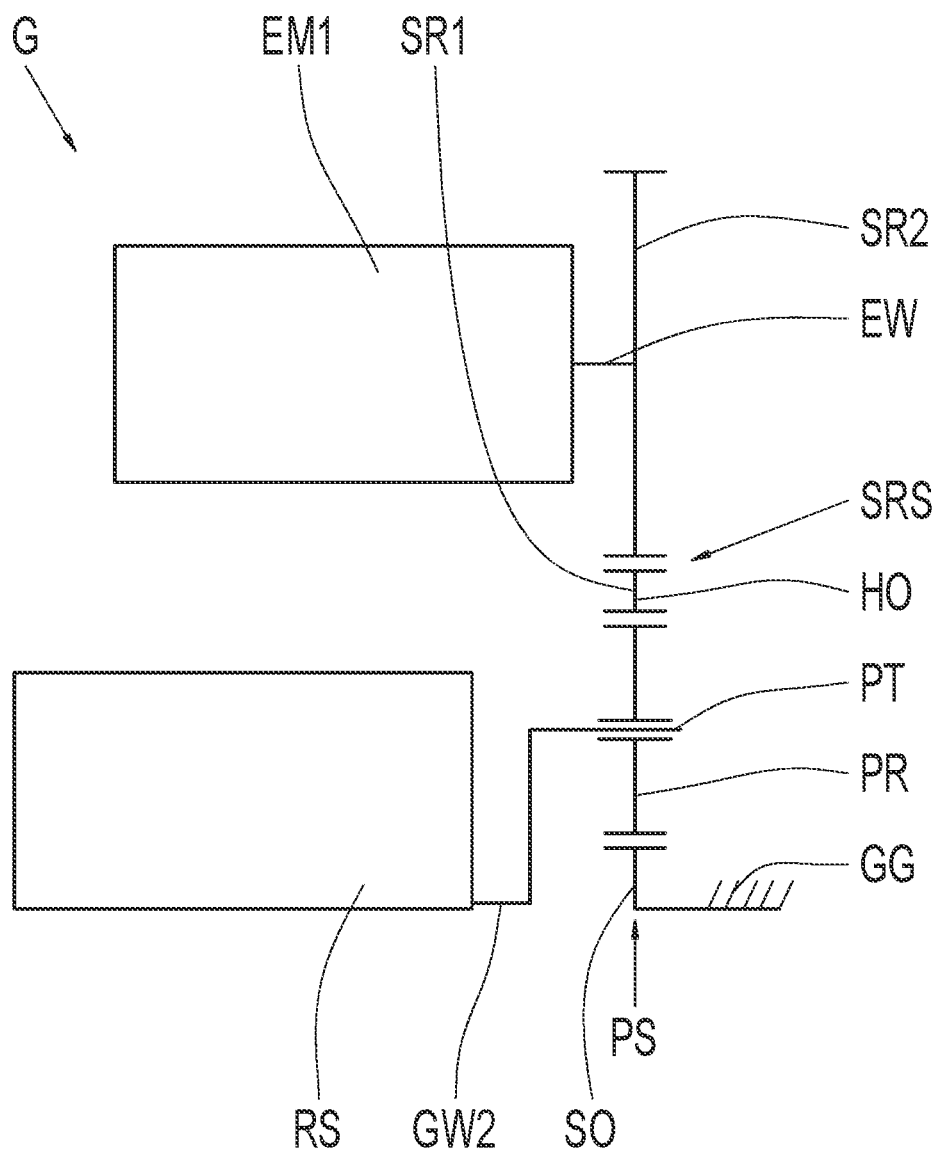

In the case of the example modification from FIG. 14 as well, an integration of the electric machine EM1 is implemented by the gear set RS via a planetary gear stage PS and a spur gear stage SRS. The modification largely corresponds to the variant according to FIG. 13, with the difference that, with respect to the planetary gear stage PS, the sun gear SO is now fixed at the rotationally fixed component GG, while the ring gear HO is rotationally fixed to the first spur gear SR1 of the spur gear stage SRS. Specifically, the ring gear HO and the first spur gear SR1 are preferably designed as one piece, in that the ring gear HO is equipped, at an outer circumference, with a tooth system. For the rest, the example modification according to FIG. 14 corresponds to the example variant according to FIG. 13, and therefore reference is made to the description thereof.

Figure 15:
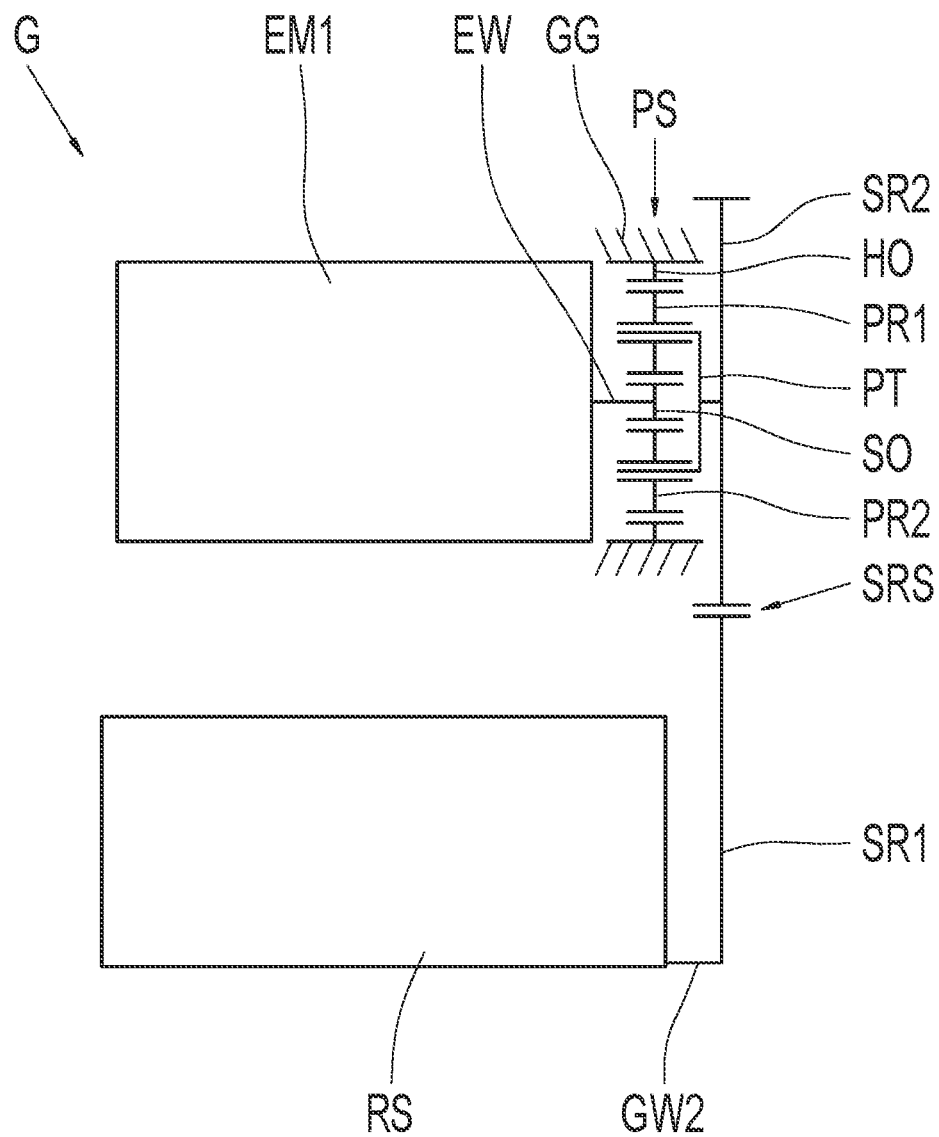

Moreover, FIG. 15 shows one further example modification of the transmissions G from FIGS. 2 through 5 as well as FIGS. 8 and 9, wherein, in this case as well, an integration of the electric machine EM1 is implemented via a spur gear stage SRS and a planetary gear stage PS. In contrast to the preceding example variant according to FIG. 14, the gear set RS is initially followed here by the spur gear stage SRS, while the planetary gear stage PS is provided in the power flow between the spur gear stage SRS and the electric machine EM1. The planetary gear stage PS also includes, once again, the elements ring gear HO, planet carrier PT, and sun gear SO, wherein the planet carrier PT guides, in a rotatably mounted manner, multiple planet gears PR1 and PR2, each of which is meshed with the sun gear SO as well as with the ring gear HO.

As is apparent in FIG. 15, a first spur gear SR1 of the spur gear stage SRS is connected in a rotationally fixed manner on the side of the gear stage RS of the transmissions G from FIGS. 2 through 5 as well as FIGS. 8 and 9, wherein this connection is completed at the second input shaft GW2. The first spur gear SR1 then intermeshes with a second spur gear SR2 of the spur gear stage SRS, which is rotationally fixed to the planet carrier PT of the planetary gear stage PS. The ring gear HO is permanently fixed at the rotationally fixed component GG, while the sun gear SO is provided, in a rotationally fixed manner, on an input shaft EW of the electric machine EM1.

Figure 16:
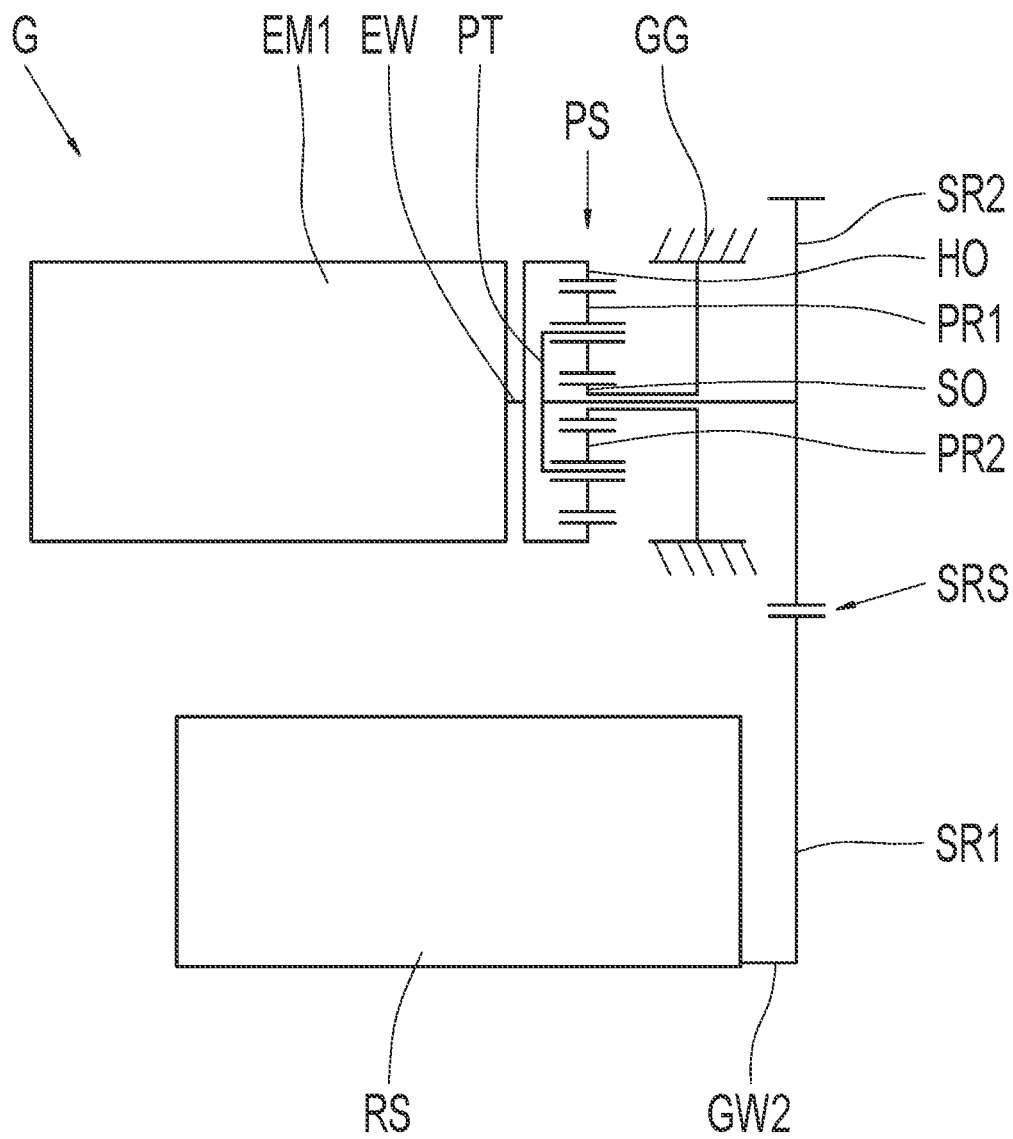

Finally, FIG. 16 shows one further example modification of the transmission G from FIGS. 2 through 5 as well as FIGS. 8 and 9, wherein this example modification essentially corresponds to the preceding example variant according to FIG. 15. The only difference is that the sun gear SO of the planetary gear stage PS is now permanently fixed at the rotationally fixed component GG, while the ring gear HO of the planetary gear stage PS is rotationally fixed to the input shaft EW of the electric machine EM1. For the rest, the example modification according to FIG. 16 corresponds to the example variant according to FIG. 15, and therefore reference is made to the description thereof.

Figure 17:
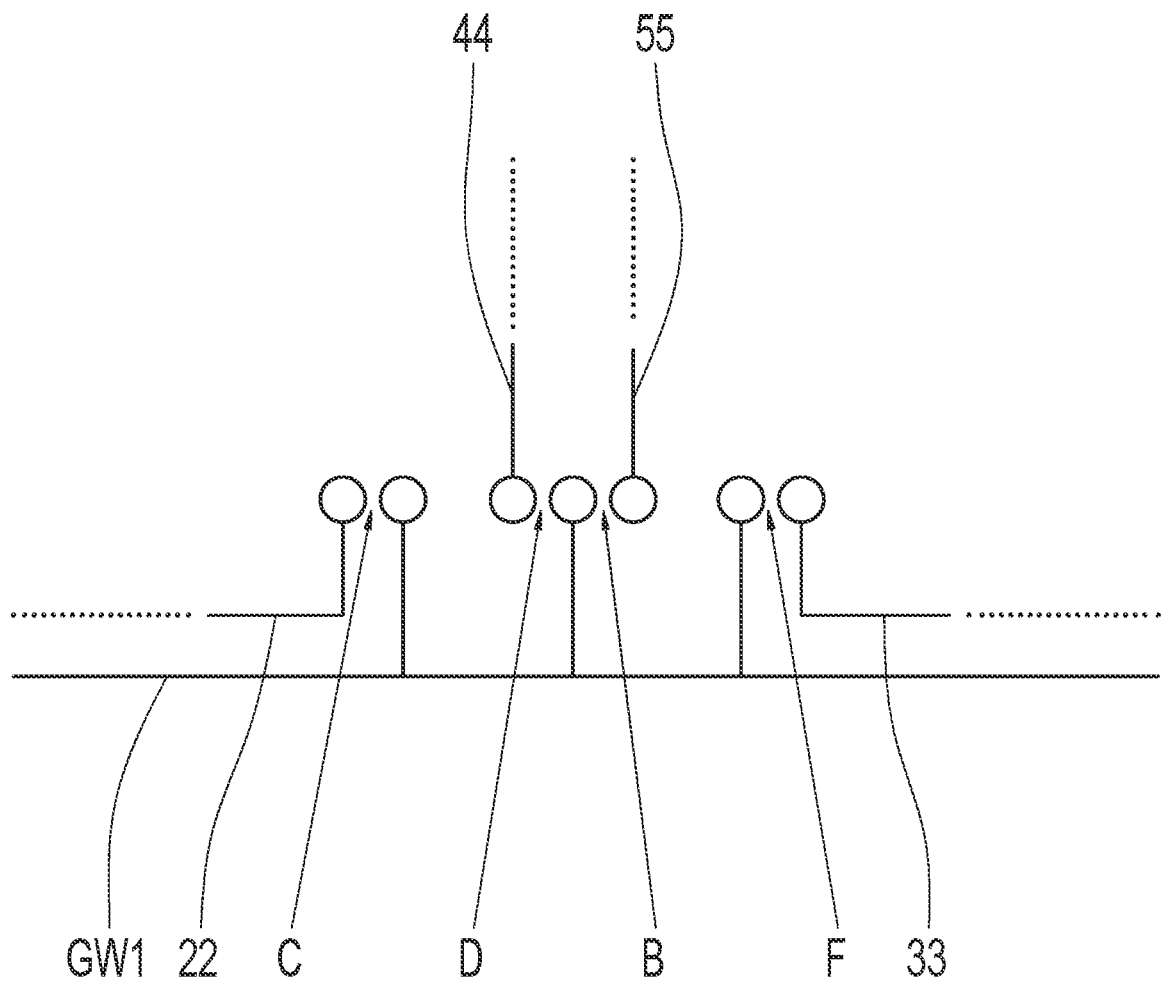
FIG. 17 shows a section of the transmissions from FIGS. 4 and 9.

FIG. 17 shows a section of the four inner shift elements, namely the second shift element B, the third shift element C, the fourth shift element D, and the sixth shift element F from the transmission according to FIGS. 4 and 9 in a simplified diagrammatic view. As is readily apparent, the four shift elements B, C, D, and F are associated with the same shaft, namely the first input shaft GW1, wherein the two "outer" shift elements C and F are spatially separated by the shift elements D and B. The manner in which four shift elements of this type can be actuated by only two actuators is the object of FIGS. 18 through 22.

FIGS. 18 through 22 each show a schematic of an actuating unit 10 of the type which can be utilized, for example, for actuating the second shift element B, the third shift element C, the fourth shift element D, and the sixth shift element F. The shift elements B, C, D, and F can be actuated from the "inside" out, i.e., from the inside of the input shaft GW1. The four shift elements B, C, D, and F are actuated by two actuating elements designed as control rods S1, S2, which, in turn, are each actuated by an actuator A1, A2, respectively. The actuation of the shift elements B, C, D, and F takes place from within the input shaft, i.e., from the inside. The shift elements B, C, D, and F are constant-mesh shift elements.

Figure 18:
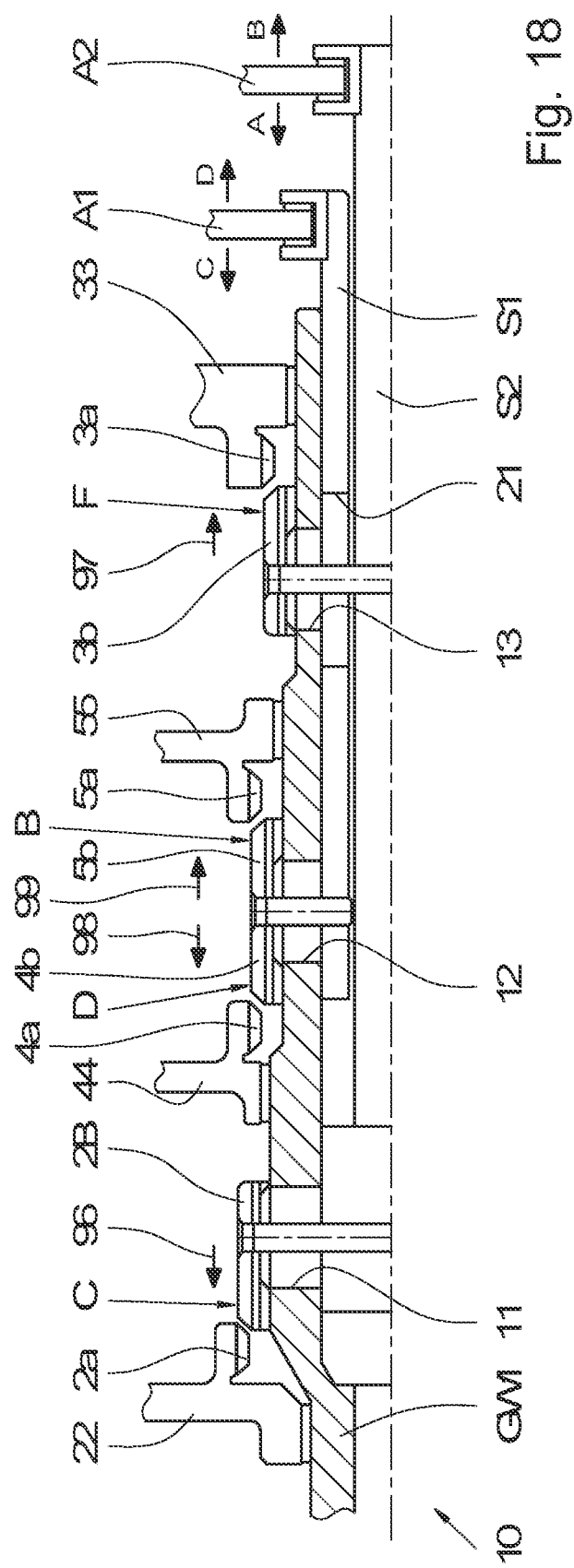

With respect to FIG. 18, the input shaft GW1 of the transmission G is designed as a hollow shaft in this case. A first control rod S1 is also designed as a hollow shaft, whereas a second control rod S2 is designed as a solid shaft. Both control rods S1, S2 are guided within the input shaft GW1, wherein the second control rod S2 is guided within the first control rod S1. As viewed radially from the outside, the sequence results: input shaft GW1, first control rod S1, second control rod S2. The first control rod S1 can be actuated by a first actuator A1, whereas the second control rod S2 can be actuated by a second actuator A2.

The actuators A1, A2 are arranged on a side of the sixth shift element F facing away from the third shift element C.

In the actuated, i.e., engaged condition, the shift elements C, D, B, and F rotationally fix the input shaft GW1 to another shaft in each case. In this way, the third shift element C connects the input shaft GW1 to a second shaft 22,
the fourth shift element D connects the input shaft GW1 to a third shaft 33,
the second shift element B connects the input shaft GW1 to a fourth shaft 44, and
the sixth shift element F connects the input shaft GW1 to a fifth shaft 55.

The second shaft 22 can form at least one portion of the second input shaft GW2 or of the second element E21 of the first planetary gear set P1 or be connected thereto. The fourth shaft 44 can form at least a portion of the third element E31 of the first planetary gear set P1 or be connected thereto. The fifth shaft 55 can form at least a portion of the second element E22 of the second planetary gear set P2 or be connected thereto. The third shaft 33 can form at least a portion of the first element E12 of the second planetary gear set P2 or be connected thereto.

For the form-fitting connections, the shafts 22, 33, 44, and 55 include tooth systems 2a, 3a, 4a, and 5a, respectively, which correspond to tooth systems 2b, 3b, 4b, and 5b, respectively, of the dogs. The mode of operation of dog clutches is known from the prior art, and so it will not be discussed in greater detail here.

Each control rod S1, S2 can actuate precisely two shift elements. As is to be easily derived from FIG. 17, the first control rod S1 actuates the second shift element B and the fourth shift element D, which are designed as a double shift element in the present case. The second control rod S2, however, actuates the shift elements C, F spatially separated from one another.

In order to actuate the fourth shift element D, the first actuator A1, starting from a non-actuated condition, moves the first gear change rod S1 in the arrow direction 98, i.e., toward the left in the viewing direction. In order to actuate the second shift element B, the first actuator A1, starting from a non-actuated condition, moves the first gear change rod S1 in the arrow direction 99, i.e., toward the right in the viewing direction.

In order to actuate the third shift element C, the second actuator A2, starting from a non-actuated condition, moves the second gear change rod S2 in the arrow direction 96, i.e., toward the left in the viewing direction. In order to actuate the sixth shift element F, the second actuator A2, starting from a non-actuated condition, moves the second gear change rod S2 in the arrow direction 97, i.e., toward the right in the viewing direction.

In order to ensure that the shift elements can be actuated from within the input shaft GW1, the input shaft GW1 includes three recesses, namely a first recess 11, a second recess 12, and a third recess 13. In addition, the first control rod S1 includes a recess 21. The recesses are oblong holes in the present case.

A mechanical coupling or connection of the third shift element C with the second control rod S2 takes place through the first oblong hole 11 of the input shaft GW1. A mechanical coupling of the shift elements B, D with the first control rod S1 takes place through the second oblong hole 12 of the input shaft GW1. Due to the design as a double shift element, the mechanical connection of two shift elements is possible through only one oblong hole. The mechanical coupling of the sixth shift element F, however, takes place through the two mutually corresponding, i.e., essentially aligned oblong holes 13, 21 of the input shaft GW1 and the first control rod S1, respectively.

The particular shift element C, D, B, and F is rotationally fixed to the control rod S1, S2 via a section (not described in greater detail), which is guided through the particular oblong hole 11, 12, 13, and 21.

The shift elements C and F, on the one hand, and D and B, on the other hand, are collectively controlled. This means, when the third shift element C is engaged, the sixth shift element F is simultaneously disengaged, and vice versa. The same also applies for the shift elements C and D.

In order to ensure that the one control rod does not inadvertently move the other control rod and, thereby, possibly engage or disengage a shift element, the oblong hole 21 of the first control rod S1 has a larger diameter than the third oblong hole 13 of the input shaft GW1. In the present case, the diameter is twice as great. As is also apparent, the two control rods are aligned with respect to one another in such a way that the two oblong holes 13, 21 are aligned with one another when the shift elements are each in a non-actuated condition.

By the actuating unit 10, the two shift elements C, F arranged on the outside can be actuated by only one gear change rod and by only one actuator. Therefore, only two actuators A1, A2 are necessary for the four shift elements C, D, B, and F.

Figure 19:
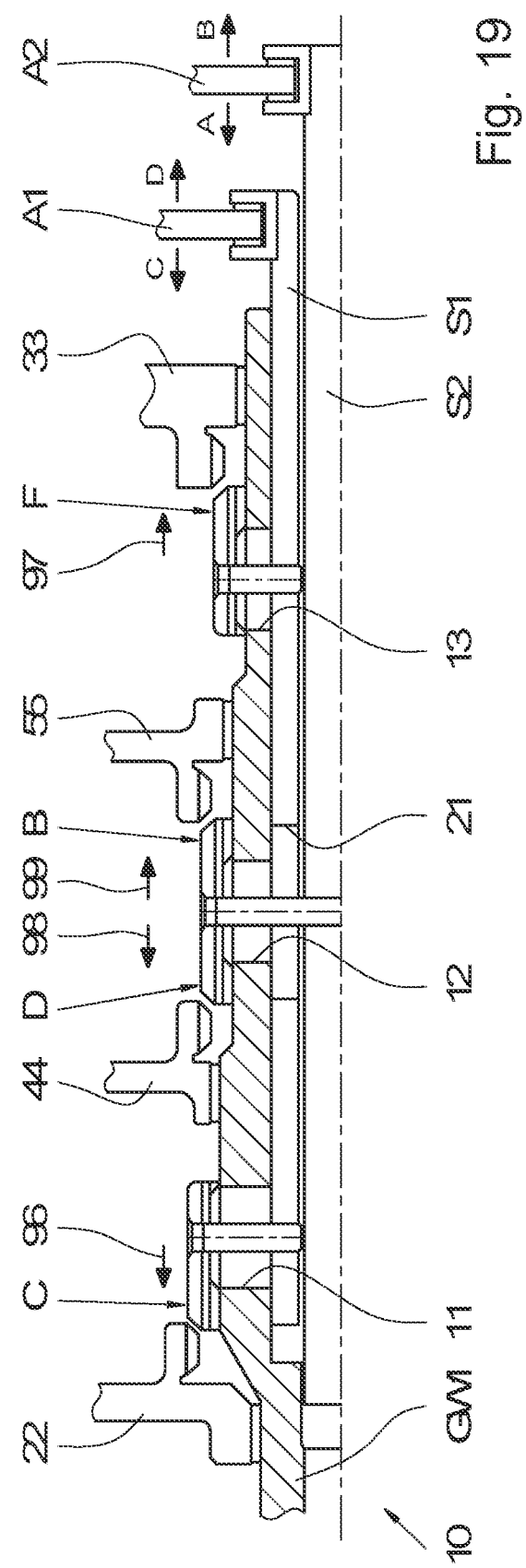

FIG. 19 shows a schematic of the actuating unit 10 in a second example embodiment. In contrast to the example embodiment according to FIG. 17, the first control rod S1 actuates the two shift elements C and F. The shift elements D and B are actuated by the second control rod S2, however. For this purpose, the oblong hole 21 is arranged in the first control rod S1 in such a way that the oblong hole 21 corresponds to the second oblong hole 12 of the input shaft GW1. The oblong holes 11, 12, 13 remain unchanged.

In order to actuate the shift element D, the second actuator A2, starting from a non-actuated condition, therefore moves the second gear change rod S2 in the arrow direction 98, i.e., toward the left in the viewing direction. In order to actuate the shift element B, the second actuator A2, starting from a non-actuated condition, moves the second gear change rod S2 in the arrow direction 99, i.e., toward the right in the viewing direction.

In order to actuate the shift element C, the first actuator A1, starting from a non-actuated condition, moves the first gear change rod S1 in the arrow direction 96, i.e., toward the left in the viewing direction. In order to actuate the shift element F, the first actuator A1, starting from a non-actuated condition, moves the first gear change rod S1 in the arrow direction 97, i.e., toward the right in the viewing direction. For the rest, the example variant according to FIG. 19 corresponds to the example embodiment according to FIG. 18, and therefore reference is made to the description thereof.

Figure 20:
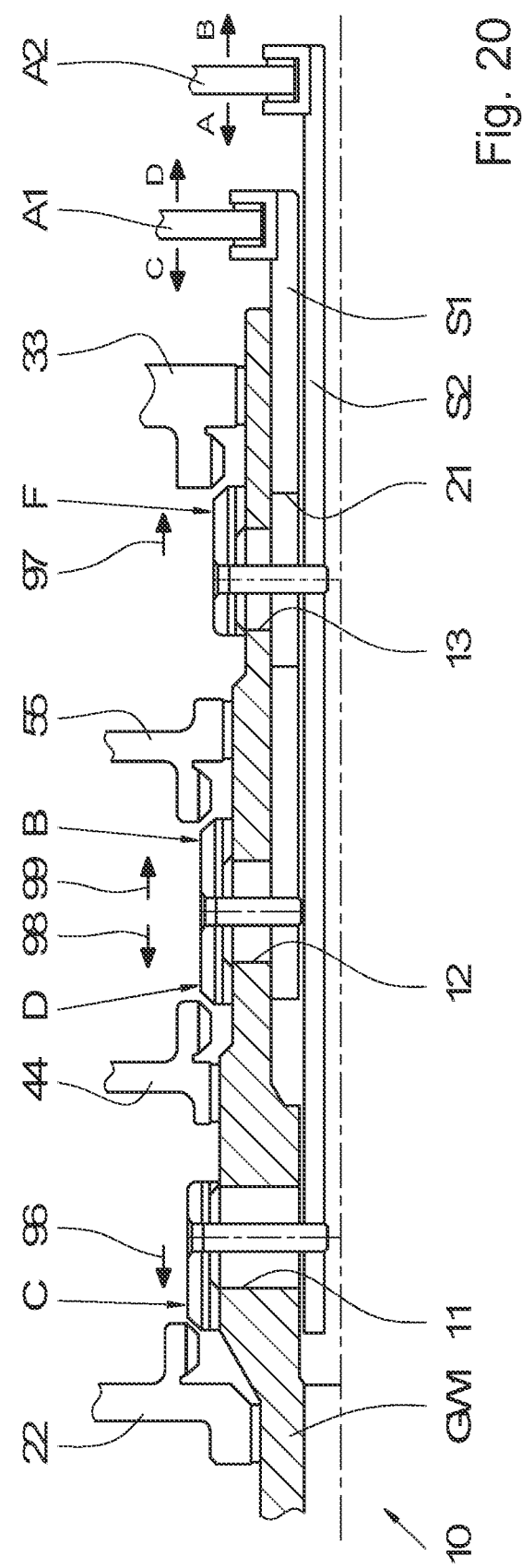

FIG. 20 shows a schematic of the actuating unit 10 in a third example embodiment. In contrast to the example embodiment according to FIG. 19, the second control rod S2 is designed as a hollow shaft. This allows for a lighter weight and offers space for an oil lubrication (not represented in the present case). For the rest, the example variant according to FIG. 20 corresponds to the example embodiment according to FIG. 18, and therefore reference is made to the description thereof.

Figure 21:
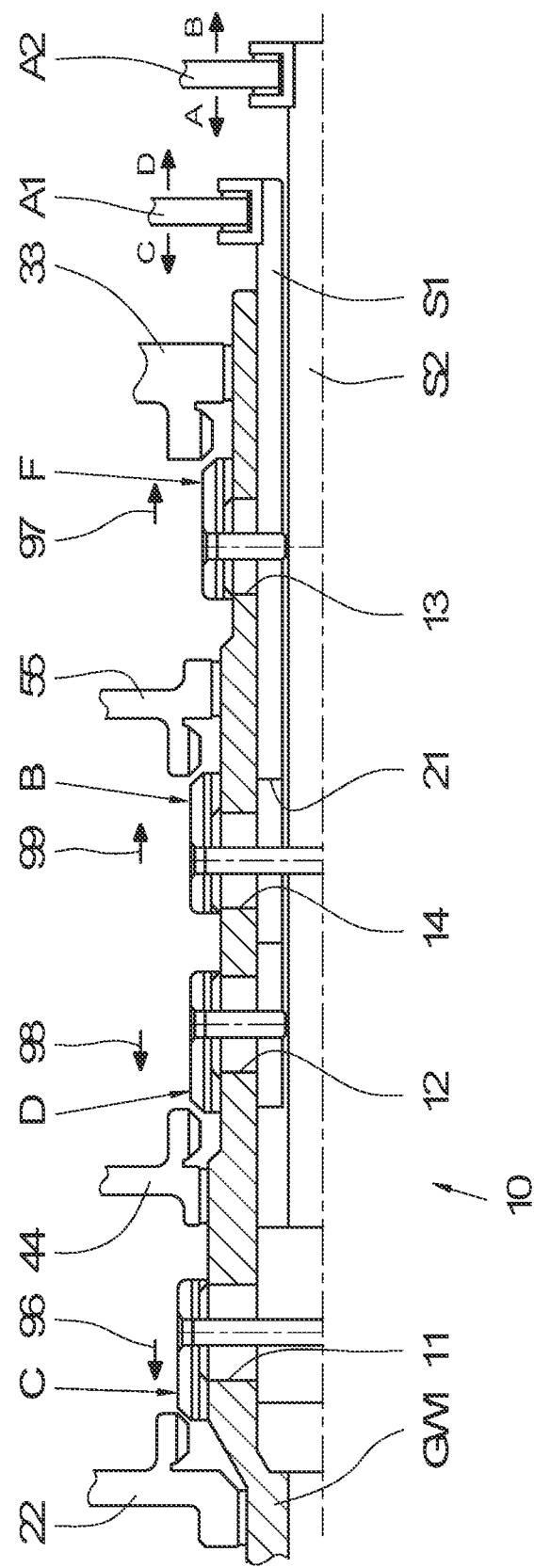

FIG. 21 shows a schematic of the actuating unit 10 in one further example embodiment. In contrast to the example embodiment according to FIG. 18, the shift elements D and B are each designed as a single shift element. This makes a fourth oblong hole 14 in the input shaft GW1 necessary. The fourth oblong hole 14 is arranged axially between the second oblong hole 12 and the third oblong hole 13.

In contrast to the example embodiment according to FIG. 18, the fourth oblong hole 14 of the input shaft GW1 now corresponds to the oblong hole 21 of the first control rod S1. In this way, four spatially separated shift elements, namely A and D, on the one hand, and C and D, on the other hand, can be actuated by precisely two actuators A1, A2. For the rest, the example variant according to FIG. 21 corresponds to the example embodiment according to FIG. 18, and therefore reference is made to the description thereof.

FIG. 22 shows a schematic of the actuating unit 10 in one further example embodiment. In contrast to the example embodiment according to FIG. 18, the shift elements D and B are each designed as a single shift element. This makes a fourth oblong hole 14 in the input shaft GW1 necessary. The fourth oblong hole 14 is arranged axially between the second oblong hole 12 and the third oblong hole 13. As in FIG. 17, the oblong hole 21 of the first control rod S1 corresponds to the third oblong hole 13 of the input shaft GW1.

As in the example embodiment according to FIG. 18, the first control rod S1 actuates the shift elements D and B, whereas the second control rod S2 actuates the shift elements C and F. For the rest, the example variant according to FIG. 22 corresponds to the example embodiment according to FIG. 18, and therefore reference is made to the description thereof.

Using example embodiments of the invention, a transmission having a compact design and good efficiency can be implemented.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
RS gear set
GG rotationally fixed component

P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
A first shift element
B second shift element
C third shift element
D fourth shift element
E fifth shift element
F sixth shift element
K seventh shift element
K0 eighth shift element
SP1 shift element pair
SP2 shift element pair
SP3 shift element pair
1 first gear
2 second gear
3.1 third gear
3.2 third gear
3.3 third gear
3.4 third gear
3.5 third gear
3.6 third gear
3.7 third gear
4 fourth gear
E2 first gear
E4 second gear
E3 third gear
V3 third gear
GW1 first input shaft
GW1-A mounting interface
GW2 second input shaft
GWA output shaft
GWA-A mounting interface
AN connection shaft
EM1 electric machine
S1 stator
R1 rotor
EM2 electric machine
S2 stator
R2 rotor
SRS spur gear stage
SR1 spur gear
SR2 spur gear
PS planetary gear stage
HO ring gear
PT planet carrier
PR planet gear
PR1 planet gear
PR2 planet gear
SO sun gear
ZT flexible traction drive mechanism
VKM internal combustion engine
TS torsional vibration damper
AG differential gear
DW driving wheels
22 shaft
33 shaft
44 shaft
55 shaft
11 recess, oblong hole, bore hole
12 recess, oblong hole, bore hole
13 recess, oblong hole, bore hole
14 recess, oblong hole, bore hole
21 recess, oblong hole, bore hole
96 direction
97 direction
98 direction
99 direction
A1 actuator
A2 actuator
S1 actuating element, control rod
S2 actuating element, control rod

The invention claimed is:

1. A transmission (G) for a motor vehicle, comprising:
an electric machine (EM1);
a first input shaft (GW1);
a second input shaft (GW2);
an output shaft (GWA);
a first planetary gear set (P1) and a second planetary gear set (P2), the first and second planetary gear sets (P1, P2) each comprising a first element (E11, E12), a second element (E21, E22), and a third element (E31, E32); and
a first shift element (A), a second shift element (B), a third shift element (C), a fourth shift element (D), and a fifth shift element (E),
wherein a rotor (R1) of the electric machine (EM1) is connected to the second input shaft (GW2),
wherein the output shaft (GWA) is rotationally fixed to the second element (E22) of the second planetary gear set (P2), is rotationally fixable to the first input shaft (GW1) with the second shift element (B), and is connectable to the third element (E31) of the first planetary gear set (P1) with the fifth shift element (E),
wherein the first element (E11) of the first planetary gear set (P1) is fixed to a rotationally fixed component (GG),
wherein the first element (E12) of the second planetary gear set (P2) is fixable to the rotationally fixed component (GG) with the first shift element (A),
the second input shaft (GW2) is rotationally fixed to the second element (E21) of the first planetary gear set (P1) as well as to the third element (E32) of the second planetary gear set (P2), and
wherein the first input shaft (GW1) is rotationally fixable to the second element (E21) of the first planetary gear set (P1) with the third shift element (C) and is rotationally fixable to the third element (E31) of the first planetary gear set (P1) with the fourth shift element (D).

2. The transmission (G) of claim 1, wherein selective actuation of the first, second, third, fourth, and fifth shift elements (A, B, C, D, E) implements:
a first gear (1) between the first input shaft (GW1) and the output shaft (GWA) by engaging the first shift element (A) and the fourth shift element (D);
a second gear between the first input shaft (GW1) and the output shaft (GWA) by engaging the first shift element (A) and the third shift element (C);
a third gear between the first input shaft (GW1) and the output shaft (GWA)
in a first variant (3.1) by engaging the first shift element (A) and the second shift element (B),
in a second variant (3.2) by engaging the second shift element (B) and the fifth shift element (E),
in a third variant (3.3) by engaging the fourth shift element (D) and the fifth shift element (E),
in a fourth variant (3.4) by engaging the second shift element (B) and the third shift element (C), in a fifth variant (3.5) by engaging the second shift element (B) and the fourth shift element (D); and a fourth gear between the first input shaft (GW1) and the output shaft (GWA) by engaging the third shift element (C) and the fifth shift element (E).

3. The transmission (G) of claim 1, wherein:

a first gear (E2) results between the second input shaft (GW2) and the output shaft (GWA) by engaging the first shift element (A); and a second gear (E4) results between the second input shaft (GW2) and the output shaft (GWA) by engaging the fifth shift element (E).

4. The transmission (G) of claim 1, further comprising a sixth shift element (F) arranged and configured for selectively connecting the first element (E12) of the second planetary gear set (P2) to the first input shaft (GW1).

5. The transmission (G) of claim 4, wherein selective engagement of the first, second, third, fourth, fifth, and sixth shift elements (A, B, C, D, E, F) implements a third gear between the first input shaft (GW1) and the output shaft (GWA)

in a sixth variant (3.6) by engaging the second shift element (B) and the sixth shift element (F), and in a seventh variant (3.7) by engaging the third shift element (C) and the sixth shift element (F).

6. The transmission (G) of claim 4, wherein:

the third shift element (C) and the sixth shift element (F) are combined to form a shift element pair (SP3);

an actuating element is associated with the shift element pair (SP3); and the shift element pair (SP3) is configured such that either the third shift element (C) or the sixth shift element (F) is engageable by the actuating element from a neutral position of the actuating element.

7. The transmission (G) of claim 1, further comprising a seventh shift element (K) arranged and configured for selectively interlocking the second planetary gear set (P2).

8. The transmission (G) of claim 7, wherein a third gear (E3) results between the second input shaft (GW2) and the output shaft (GWA) by engaging the seventh shift element (K).

9. The transmission (G) of claim 1, further comprising a further electric machine (EM2), a rotor (R2) of the further electric machine (EM2) connected at the first input shaft (GW1).

10. The transmission (G) of claim 1, further comprising an eighth shift element (K0), the first input shaft (GW1) is rotationally fixable to a connection shaft (AN) with the eighth shift element (K0).

11. The transmission (G) of claim 1, wherein one or more of the first, second, third, fourth, and fifth shift elements (A, B, C, D, E, F, K, K0) is a form-locking shift element.

12. The transmission (G) of claim 1, wherein one or both of the first and second planetary gear sets (P1, P2) is a minus planetary gear set, wherein the first element (E11, E12) of each minus planetary gear set is a respective sun gear, the second element (E21, E22) of each minus planetary gear set is a respective planet carrier, and the third element (E31, E32) of each minus planetary gear set is a respective ring gear.

13. The transmission (G) of claim 1, wherein:

the second shift element (B) and the third shift element (C) are combined to form a shift element pair (SP2);

an actuating element is associated with the shift element pair (SP2); and the shift element pair (SP2) is configured such that either the second shift element (B) or the third shift element (C) is engageable by the actuating element from a neutral position of the actuating element.

14. The transmission (G) of claim 1, wherein:

the second shift element (B) and the fourth shift element (D) are combined to form a shift element pair (SP2);

an actuating element is associated with the shift element pair (SP2); and the shift element pair (SP2) is configured such that either the second shift element (B) or the fourth shift element (D) is engageable by the actuating element from a neutral position of the actuating element.

15. The transmission (G) of claim 1, wherein the rotor (R1) of the electric machine (EM1) is rotationally fixed to the second input shaft (GW2) or is connected to the second input shaft (GW2) with at least one gear stage.

16. A motor vehicle drive train for a hybrid or electric vehicle, comprising the transmission (G) of claim 1.

17. A method for operating the transmission (G) of claim 1, wherein only the third shift element (C) is engaged in order to implement a charging operation or a starting operation.

* * * * *